US006136068A

United States Patent [19]

Peters

[11] Patent Number: 6,136,068

[45] Date of Patent: Oct. 24, 2000

[54] ARC FURNACE FUME COLLECTION METHOD

[75] Inventor: Craig L. Peters, Western Springs, Ill.

[73] Assignee: AMSTED Industries Incorporated, Chicago, Ill.

[21] Appl. No.: 09/255,156

[22] Filed: Feb. 22, 1999

Related U.S. Application Data

[62] Division of application No. 08/680,145, Jul. 15, 1996, Pat. No. 5,905,752.

[51] Int. Cl.[7] .................................................. B01D 29/66

[52] U.S. Cl. ...................................... 95/20; 95/23; 95/280

[58] Field of Search .................................. 95/19, 20, 22, 95/23, 280; 55/283, 302

[56] References Cited

U.S. PATENT DOCUMENTS

| | | | |
|---|---|---|---|
| 3,948,623 | 4/1976 | Ostby et al. | 95/23 |
| 3,999,001 | 12/1976 | Overmyer et al. | 13/10 |
| 4,277,255 | 7/1981 | Apelgren | 95/23 X |
| 4,500,326 | 2/1985 | Sunter | 95/20 |
| 4,786,293 | 11/1988 | Labadie | 95/20 |
| 4,820,317 | 4/1989 | Fahey | 95/22 |
| 4,865,627 | 9/1989 | Dewitz et al. | 95/23 X |
| 5,094,675 | 3/1992 | Pitt et al. | 95/20 |
| 5,174,797 | 12/1992 | Yow, Sr. et al. | 95/20 |
| 5,244,480 | 9/1993 | Henry | 95/19 X |
| 5,391,218 | 2/1995 | Jorgenson et al. | 95/20 |
| 5,505,763 | 4/1996 | Reighard et al. | 95/280 X |
| 5,830,249 | 11/1998 | Hori et al. | 55/283 |
| 5,837,017 | 11/1998 | Santschi et al. | 95/20 X |

FOREIGN PATENT DOCUMENTS

| | | | |
|---|---|---|---|
| 5-115727 | 5/1993 | Japan | 95/20 |
| WO88/07404 | 10/1988 | WIPO | 95/20 |

OTHER PUBLICATIONS

Chapter 18 from The Making, Shaping and Treating of Steel, Ninth Edition, Edited by Harold E. McGannon, 1971.

*Primary Examiner*—Robert H. Spitzer
*Attorney, Agent, or Firm*—Edward J. Brosius; F. S. Gregorczyk; Stephen J. Manich

[57] ABSTRACT

The present invention provides a system and method for collecting fumes from an arc furnace of the type typically used in metal foundries. The system provides an electrode hood with extended sides for improved collection of fumes from the vicinity of the electrodes. It also provides a movable spout hood for collection of fumes when metal is tapped. A combination of a tilting manifold and stationary duct are used to maintain a path for collecting fumes throughout the entire range of motion of the furnace. The stationary duct has a group of dampers that open and close as the furnace tilts. Variable position dampers may be provided at the electrode hood and furnace door. In the bag house, there is a dust containment assembly to limit the movement of the collected dust. A variable speed fan may be used with the system. One method of the invention involves determining the pressure differential upstream and downstream of the filter bag, determining the fan speed, and closing a damper downstream of the filter to clean the filter bag when the determined values for the pressure differential and fan speed match previously set values. The entire system may be controlled by a programmable logic element to maximize efficiency. Another method involves the steps of adjusting the electrode hood damper, spout hood damper and door hood damper in response to furnace conditions.

5 Claims, 13 Drawing Sheets

ARC FURNACE FUME COLLECTION METHOD

This is a divisional of application Ser. No. 08/680,145 filed on Jul. 15, 1996, now U.S. Pat. No. 5,905,752, the disclosure of which is incorporated by reference herein in its entirety.

BACKGROUND OF THE INVENTION

1. Field of the Invention

The present invention relates to air quality control systems, and more particularly, to air quality control systems useful with electric arc furnaces for melting steel in steel casting operations.

2. Description of the Prior Art

Electric arc furnaces are well known in the steel foundry art. Such furnaces typically employ a large covered crucible for melting steel. Molten steel is then poured through a furnace spout from the crucible to a ladle, for example, that may deliver the molten steel to a mold where the molten steel is poured from the ladle to make a steel casting.

In such furnaces, a group of electrodes are typically introduced into the crucible through openings in the furnace roof. These electrodes serve to heat the contents of the crucible to the desired temperature. The body of the crucible usually has several other openings, for various purposes. A door, such as a back door, is provided for the foundry person to check on the state of the molten material, for insertion and operation of various tools, such as an oxygen lance into the interior of the crucible, and for charging the material with additional ingredients. A pebble lime intake pipe is also included in such furnaces for introduction of pebble lime into the crucible. The roof has three openings through which the electrodes are inserted and removed for heating the metal within the crucible. The furnace also has a spout for tapping molten metal out of the furnace when desired.

To tap the molten steel from the furnace, the entire furnace must be tilted. When the furnace is tilted, the roof of the furnace and the electrodes move through an arc so that the molten metal will flow through the spout.

Use of such furnaces typically results in the generation of fumes, which can exit the furnace from different openings at different times, and in different concentrations at different phases of the process. For example, during melting of the scrap steel, fumes may emit from the roof openings at the electrodes, at the juncture of the roof and the crucible, and through the door. During tapping of the molten steel, the majority of the dust and fumes may be emitted from the vicinity of the spout, with smaller quantities escaping from the electrode roof holes and door. Dust and fumes may also be generated at other sites outside of the typical steel casting facility, such as at the bag house.

One standard air quality control system for use in such environments comprises a canopy hood that draws fumes from the entire plant environment above the furnace into an exhaust duct, and drawing the collected fumes and air to a bag house, where the fumes and air are filtered through bags for removal of particulate. However, to collect and process all of the air in the vicinity of the furnace, is costly to operate: the fan that draws the air must have a motor sized to pull a large quantity of air through the system, and it must be run for extended periods of time, using great amounts of energy at great costs. In addition, an overhead canopy does not necessarily protect the workers in the furnace area from the dust and fumes generated, since the workers are typically between the emissions source and the canopy and may be exposed to the fumes and dust that passes up to the canopy.

In some other prior art furnaces, hoods and a duct moving with the furnace were mounted to the roof of the furnace. This duct mated with stationary duct work only when the furnace was upright and was connected to a collector and fan to draw fumes from the furnace, but the hoods were rendered ineffective when the furnace was tilted to tap the molten metal; when the furnace was so tilted, the ducts became disconnected so that emissions from the furnace escaped to the plant, and so that the duct leading to the collector either drew air from the plant instead of from the furnace or was closed off so as to be ineffective.

In the bag house, air has been drawn through the filter bags, where the particulate has been collected and then dropped into receptacles for disposal. However, the collected particulate is frequently a fine powdery substance, easily dispersed into the environment when dropped into the receptacle.

SUMMARY OF THE INVENTION

The present invention provides a more efficient method of filtering dirty air, particularly for collecting and disposing of the fumes generated during operation of an electric arc furnace in a foundry or similar environment. The present invention improves efficiency by initiating a filter cleaning cycle for a particular filter when the pressure drop across that filter and fan speed match pre-set values for the pressure drop and fan speed.

DETAILED DESCRIPTION

Figure 1:
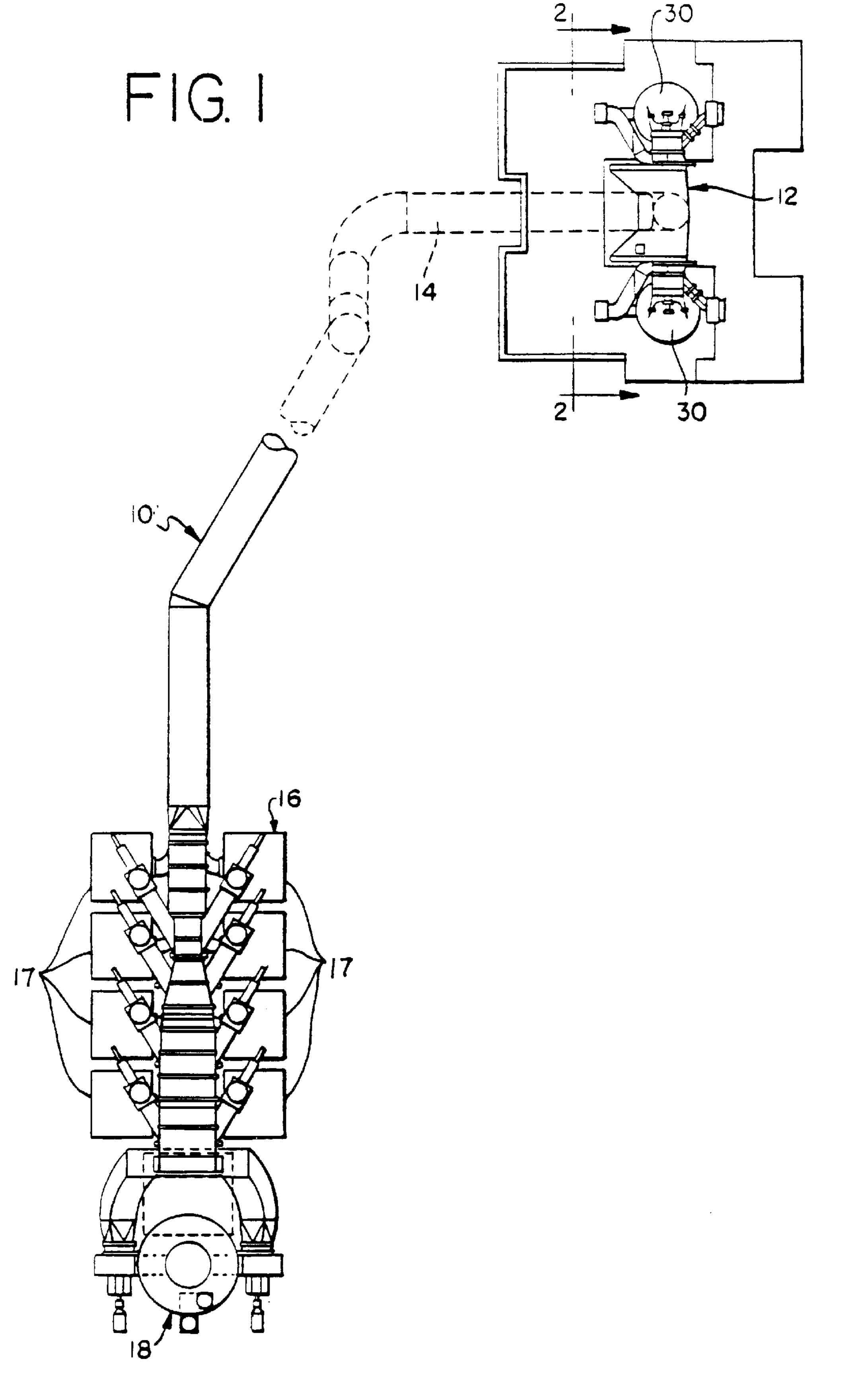
FIG. 1 is a top plan view of an embodiment of an arc furnace fume collection system in accordance with the principles of the present invention, with parts removed for clarity of illustration.

An arc furnace fume collection system 10 in accordance with the principles of the present invention is illustrated in the accompanying figures. As shown in FIG. 1, the system 10 generally includes a furnace hood assembly 12 in communication with a common duct 14 leading to a bag house 16. The bag house 16 may have one or more, and preferably several bag house collector assemblies 17. Air is drawn through this system 10 by a fan assembly 18 located in the illustrated system downstream of the bag house collector assemblies 17; fans or means for drawing collected emissions may be positioned in other locations in other systems.

The present invention is aimed at collecting emissions from the area of the furnace and transporting these emissions to the bag house for filtering. The transported emissions are filtered in the bag house and the dust removed from the air is collected in hoppers and then removed for disposal. Throughout this patent application and claims, use of the terms "emissions" and "fumes" is not intended to imply any particle size or efficiency level; when referring to "emissions" and "fumes" being collected, filtered or transported, it is not intended that it be inferred that all emissions or fumes are collected, filtered or transported, or that any particular particle size of dust is collected, filtered or transported. Instead, these terms are used in the most generic sense to refer to dusty air.

Figure 2:
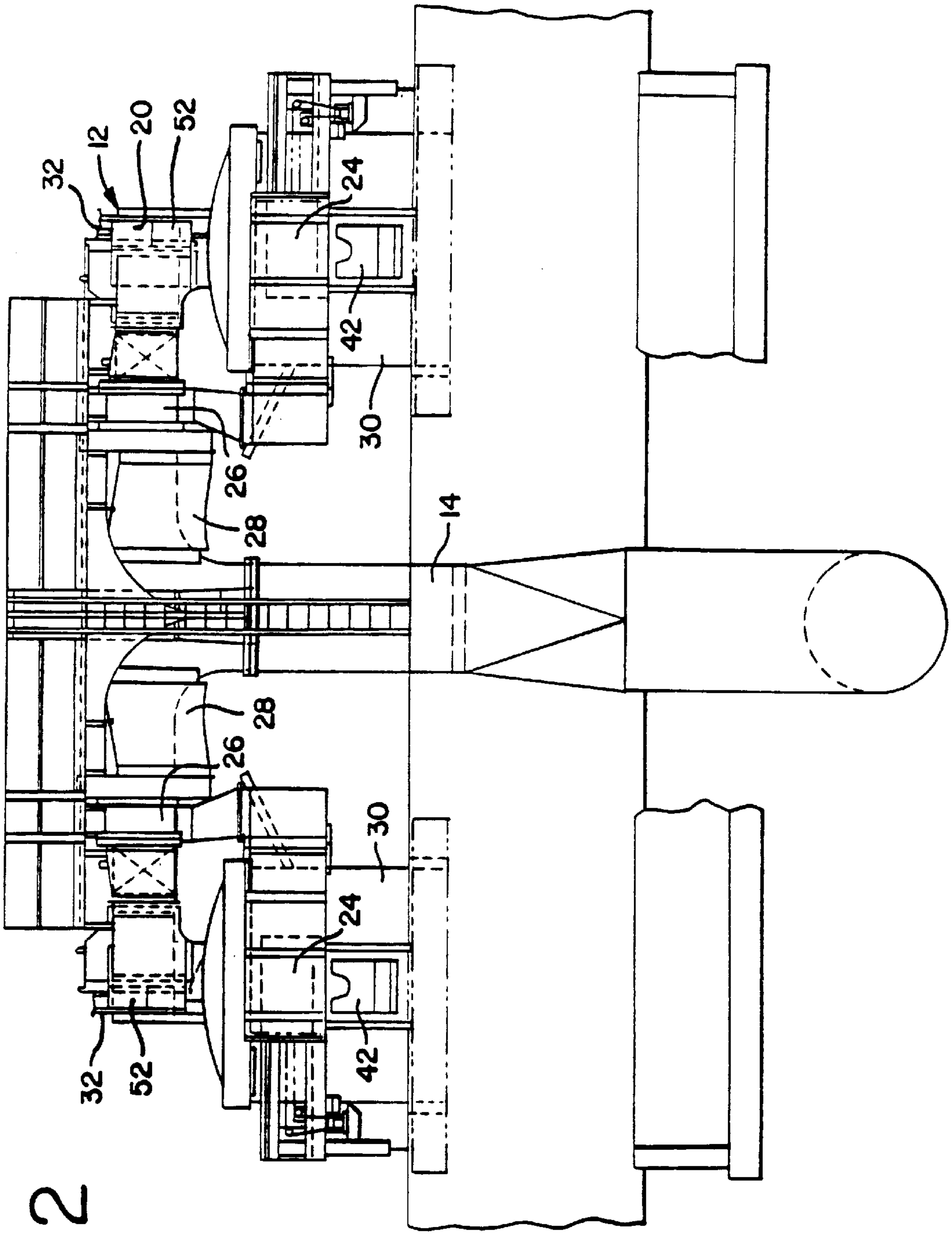
FIG. 2 is a view along line 2—2 of FIG. 1, showing a pair of arc furnaces connected to a fume collection system.
Figure 3:
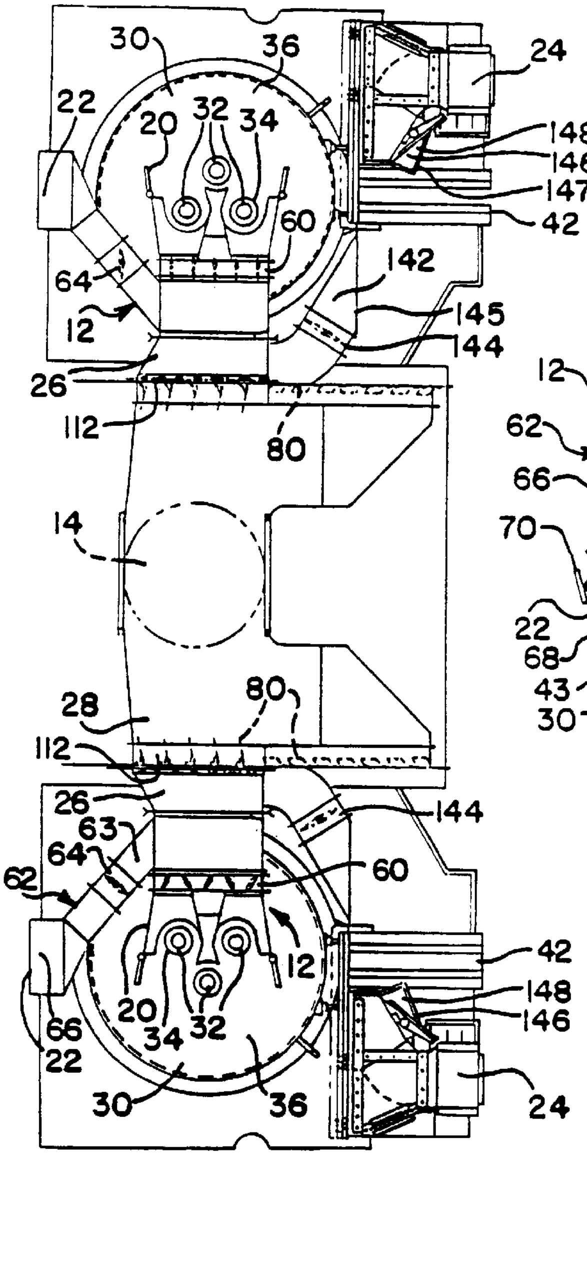
FIG. 3 is a top plan view of a pair of arc furnaces connected to a fume collection system in accordance with the present invention, in the upright position, with parts removed for clarity of illustration.
Figure 4:
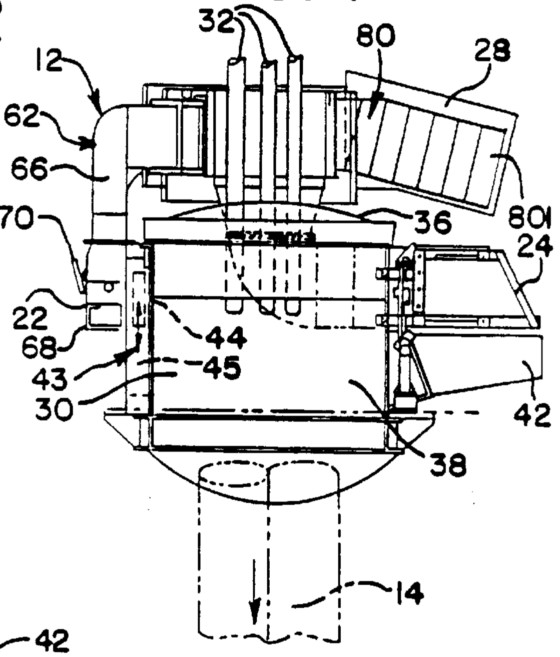
FIG. 4 is a side elevation of one of the arc furnaces of FIG. 3, in the upright position, with parts removed for clarity of illustration.
Figure 5:
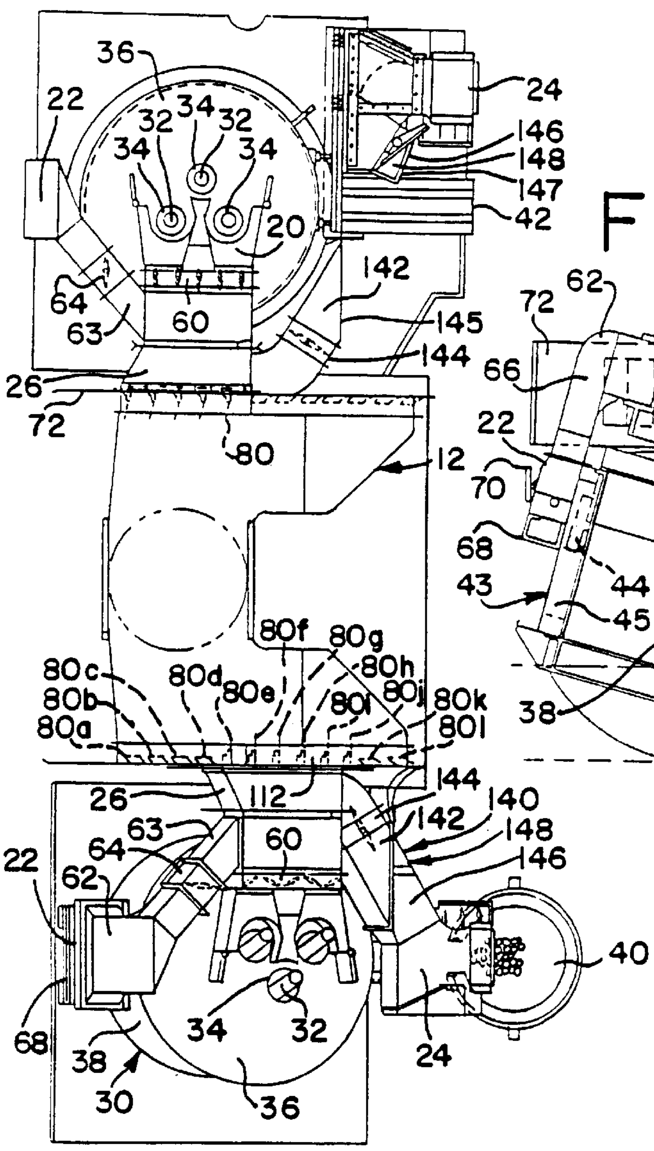
FIG. 5 is a top plan view of a pair of arc furnaces connected to a fume collection system in accordance with the present invention, with only the bottom furnace tilted partially for tapping molten metal out of the furnace, with parts removed for clarity of illustration.

As shown in FIGS. 2–4, the furnace hood assembly 12 includes both stationary elements and elements that move with the furnace as it is tilted. The movable elements include: an electrode hood or roof emissions hood 20, a door hood 22, a spout hood 24, and a tilting duct manifold 26. The tilting duct manifold 26 is next to a stationary duct 28. In the illustrated embodiment, the stationary duct 28 operates to collect emissions from two adjacent furnaces 30, and has an overall Y-shape as shown in FIG. 3. Each of the adjacent furnaces 30 has the same moveable parts, in a mirror image configuration. Generally, only one furnace of such a pair would be tapped at a time by pouring metal out of the crucible through the spout.

As shown in FIGS. 3–10, each furnace 30 is an arc furnace of the type having three electrodes 32 inserted through openings 34 in the roof 36 of the furnace 30 into the interior of the crucible 38. The electrodes, crucible and roof openings may be as are standard in the art; suitable structures for supporting the electrodes on the roof and removing and inserting them through the openings in the roof are known in the art and are not illustrated.

Figure 6:
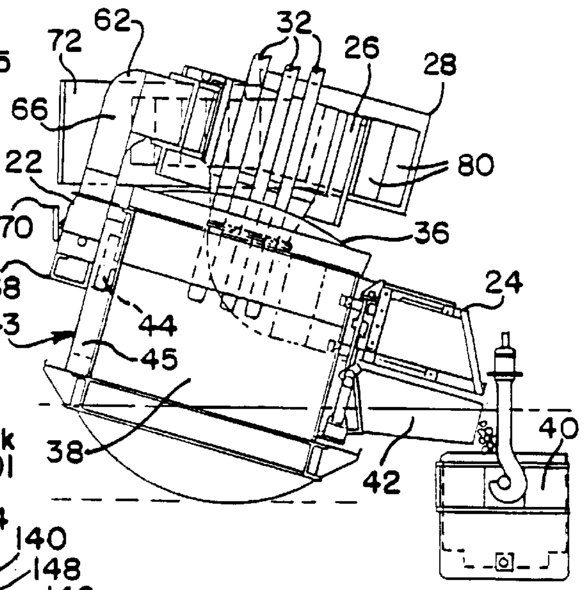
FIG. 6 is a side elevation of one of the arc furnaces of FIG. 5, partially tilted, with parts removed for clarity of illustration.
Figure 7:
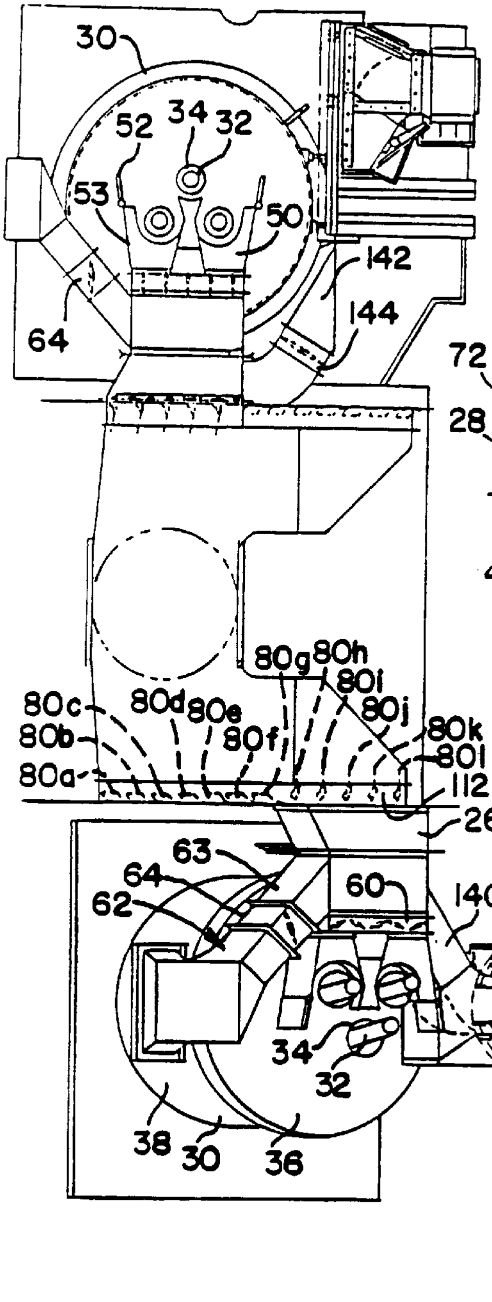
FIG. 7 is a top plan view of a pair of arc furnaces connected to a fume collection system in accordance with the present invention, with the bottom furnace fully tilted for tapping molten metal out of the furnace, with parts removed for clarity of illustration.
Figure 8:
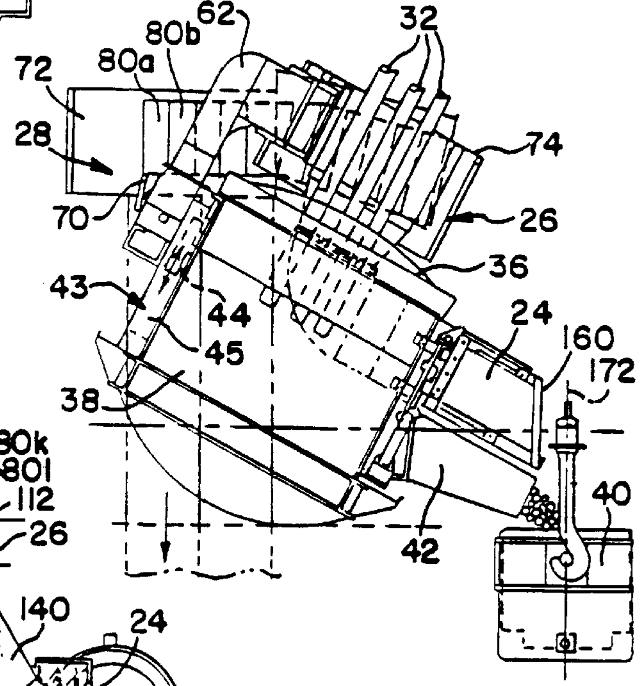
FIG. 8 is a side elevation of one of the arc furnaces of FIG. 7, fully tilted, with parts removed for clarity of illustration.

As shown in FIGS. 5–8, each furnace 30 is designed to be tipped or tilted when molten metal is tapped from the furnace. During tapping, a ladle 40 is positioned in a pit below a spout 42 of the furnace 30 and molten metal is poured from the crucible 38 through the spout 42 and into the ladle 40. The furnace is further tilted to a greater angle as shown in FIG. 8 to pour additional amounts of molten metal from the furnace and into the ladle. Possible tilting mechanisms for the furnace are known in the art, and are not illustrated.

As shown in FIGS. 3–8, such furnaces typically include a door 43 comprising a plate 44 closable over an access opening 45 in the wall of the crucible 38. The illustrated door is a back door. The door may be closed when not in use and opened to add materials to the melt, to visually inspect the melt, or to perform some task such as oxygen lancing within the furnace.

Figure 18:
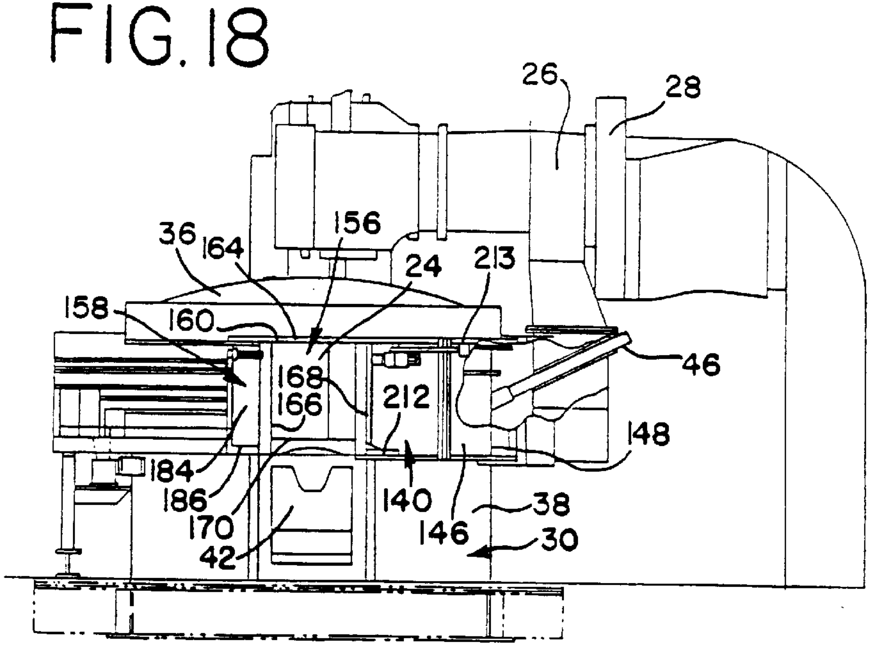
FIG. 18 is front elevation of a furnace and spout hood of the present invention.

As shown in FIG. 18, such furnaces also typically include a pebble lime intake pipe 46 that may be connected to a blower for introducing a mineral such as pebble lime into the crucible as is understood in the art.

The range of motion for the furnace as it is tapped is shown in FIGS. 5–8. As there shown, only one furnace typically is tapped at a time. The furnace 30 being tapped is tilted to a first position, as shown in FIG. 6, where molten steel begins to pour out of the crucible 38 through the spout 42, and then to a further tilted position, as shown in FIG. 8, where the tapping is completed. As seen in these sets of drawings, the positions of the electrode openings 34, roof-crucible juncture, door opening 45, and spout 42 change throughout the pouring process, making collection of fumes at these locations difficult in the prior art.

The system of the present invention works to collect dust and fumes from the various movable exit points on the furnace throughout the full range of motion of the furnace, and may employ a system of dampers controlled by a programmable logic controller so that the drawing force of the fan is concentrated at or directed to the exit points where emissions are greatest.

Figure 9:
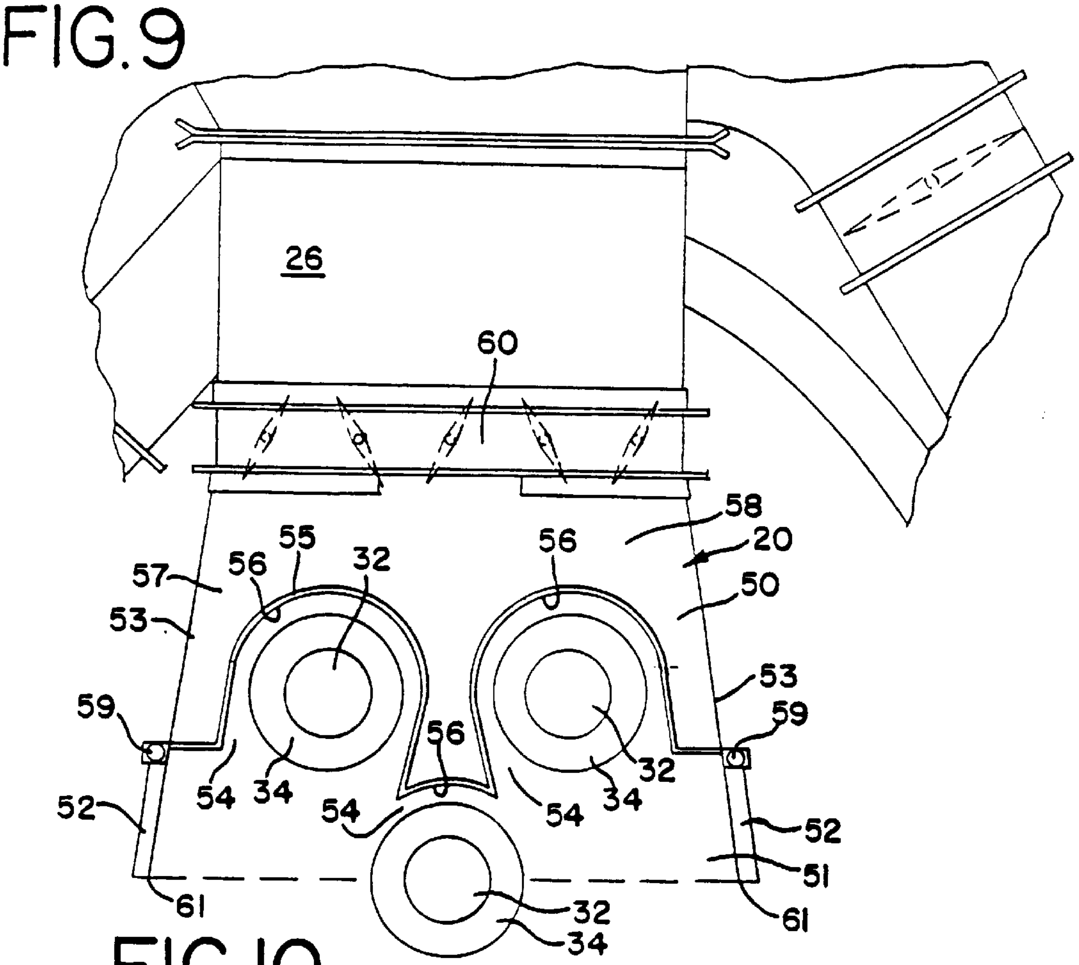
FIG. 9 is a partial top plan view of one of the furnaces of FIG. 3, showing the electrodes and electrode hood of the present invention.
Figure 10:
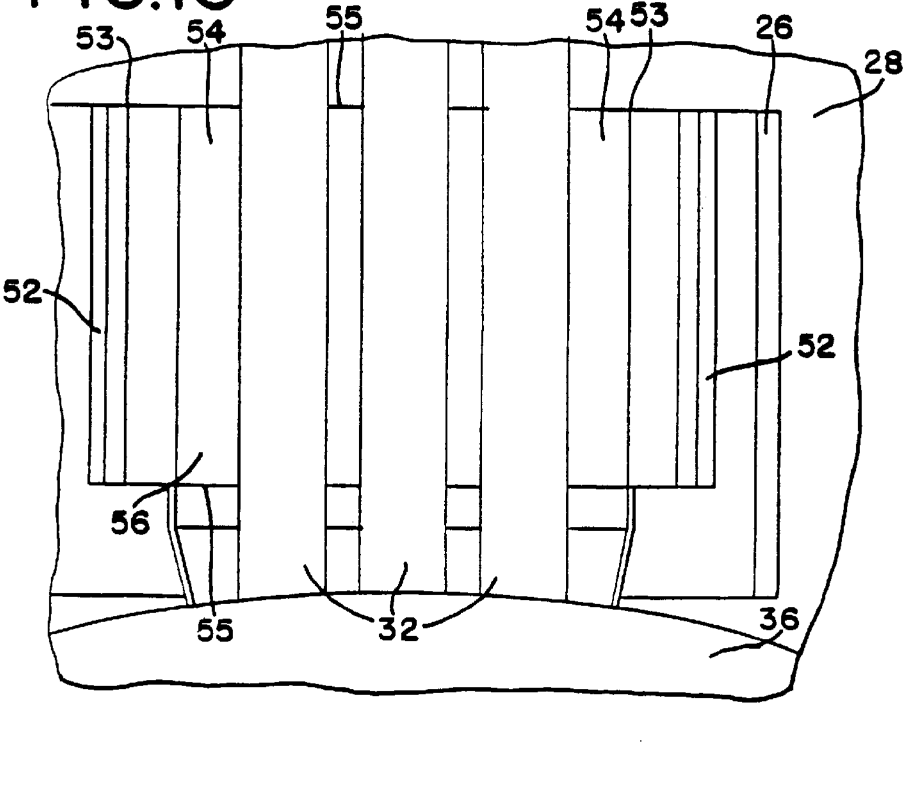
FIG. 10 is a partial front elevation of one of the furnaces, showing the electrodes and electrode hood of the present invention.

In the illustrated embodiment, as shown in FIG. 9, the roof fume or electrode hood 20 includes an electrode hood main body 50 with two extensions 52 to its most exterior side walls 53. The electrode hood 50 may be as standard in the art, with three bays 54 each adjacent to an electrode 32. Each bay area 54 has openings 56 to draw air and fumes from the vicinity of the nearby electrode, including fumes rising through the electrode openings 34 in the roof 36 of the furnace 30 and from the emissions rising from the juncture of the crucible and roof. The openings 56 in the bay areas 54 are defined by edges 55 on the main hood body 50 and are connected to a common open area 58 that is connected to the tilting duct manifold 26 through an interconnecting electrode hood damper 60.

The illustrated electrode hood side wall extensions 52 comprise a pair of planar walls connected by draft pins 59 to the most exterior side walls 53 of the two most exterior bays 54. The side wall extensions 52 are wide enough in the illustrated embodiment to extend as far out from the bays as the furthermost electrode, and in the illustrated embodiment, the side wall extensions 52 have widths great enough to extend to the centerline of the furthermost electrode opening 34. As shown in FIG. 9, the side wall extensions 52 have outermost edges 61 that, together with the edges 55 of the main hood body portion 50 define a volume 51 that is aligned with at least one of the electrode openings 34; in the illustrated embodiment the volume 51 is aligned with two of the electrode openings 34 so that all of the electrodes have parts within the volume 51, two of the electrode openings being fully aligned with the volume 51, but only a portion of the third electrode opening being aligned with the volume 51.

The side wall extensions 52 are angled to continue the angles of the side walls of the main hood body, diverging from the center of the main hood portion. The extensions 52 serve to contain some of the fumes within the working volume of the fan system, to allow more of the fumes to be collected before dissipating into the plant environment to increase the efficiency of the system. The extensions 52 of the present invention may be used with known electrode hoods of the types having bays as shown.

As shown in FIGS. 3–8, the door hood 22 of the present invention comprises a duct 62 with a section 63 leading outward from the tilting duct manifold 26 through a door damper 64 connected to a door duct section 66 that extends outward and downward parallel to the outer vertical surface of the furnace crucible 38 to an end 68 positioned above the door 43 of the furnace 30. A hinged door 70 at the end 68 of the door duct 66 may be raised so that elongated tools may be inserted into the door without interference from the door hood. The end 68 of the door duct 66 is open, so that dust and fumes within the vicinity of the door 43 may be drawn into the collection system 10 when the door damper 64 is open. The fan 18 can draw the fumes into the door duct 66, through the tilting manifold 26, stationary duct 28 and common duct 14 and into the bag house 16 for filtering and containment in a roll off hopper for disposal.

Figures 11, 12, 13:
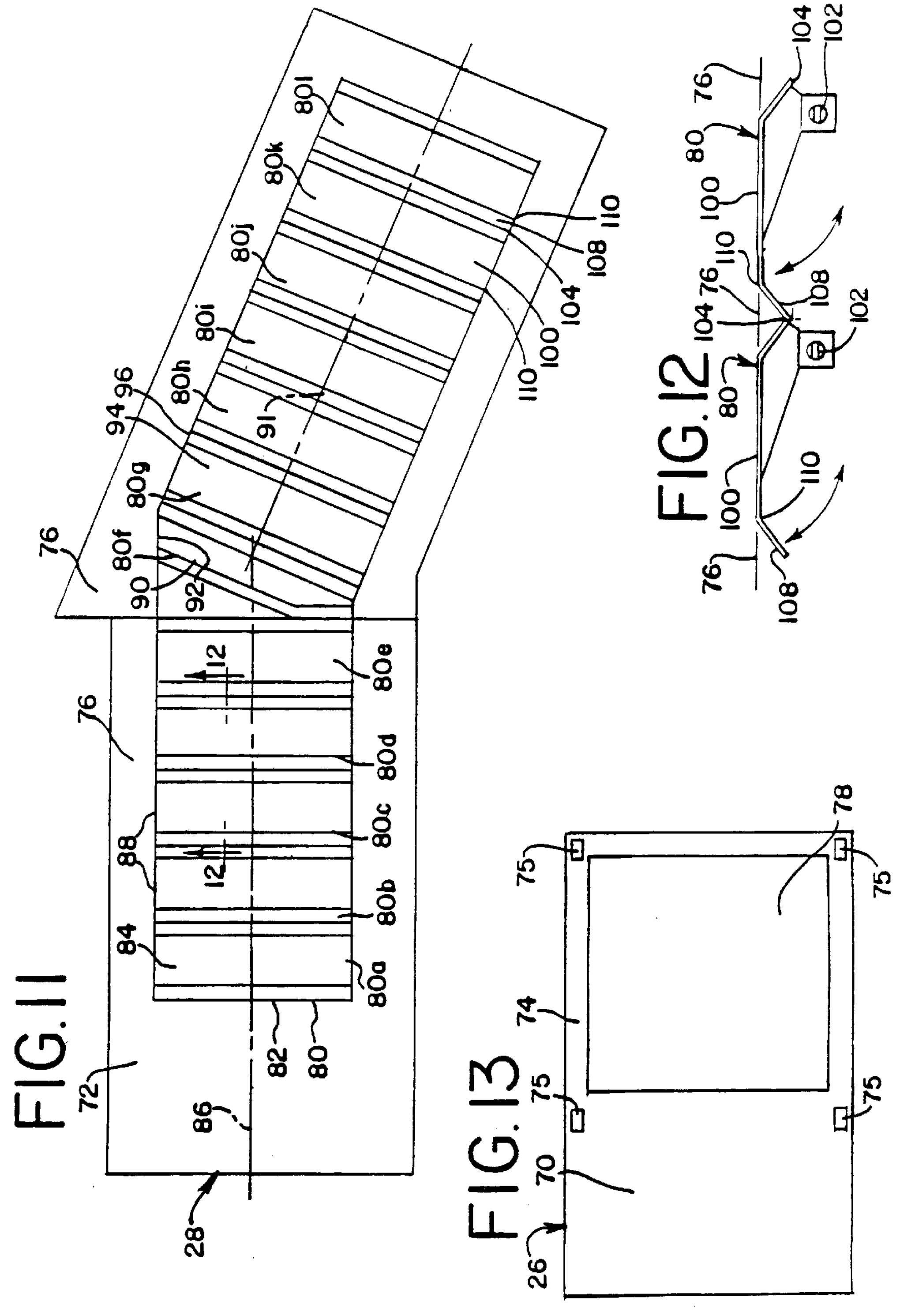
FIG. 11 is a side elevation of the stationary ducts of the present invention, showing the twelve dampers on the stationary duct.
FIG. 12 is a cross-section of two of the dampers of FIG. 11, taken along line 12—12 of FIG. 11.
FIG. 13 is a side elevation of the tilting manifold bearing surface of the present invention.

As shown in FIGS. 11 and 13 the tilting manifold 26 and stationary duct 28 each have smooth, flat mating flanges 70, 72 and smooth flat bearing faces or edges 74, 76 that are juxtaposed substantially face to face with each other. The bearing face or edge 74 of the tilting manifold 26 has a large opening 78 for air flow from the tilting manifold to the stationary duct 28. The large opening 78 of the tilting manifold receives air drawn from the spout hood, the electrode hood and the back door hood. FIGS. 11 and 13 show the two bearing surfaces of the tilting manifold and stationary duct, and parts are omitted from each for clarity of illustration. In the illustrated embodiment, the two faces 74, 76 are closely spaced at a distance of about one-quarter inch apart to minimize the amount of extraneous air that can be drawn in at their interface.

In the illustrated embodiment, the tilting manifold 26 has a set of four cam rollers 75 spaced about on its bearing edges 74. The cam rollers may be for example, all steel anti-friction rollers capable of withstanding a load of several thousand pounds, such as a three inch diameter cam roller fit into cutouts in the surface 74 of the tilting manifold. The cam rollers may facilitate movement of the tilting manifold across the stationary duct edge 72 and flange 70 and accommodate other movement of the furnace with respect to the stationary duct.

As seen in FIG. 11, the mating bearing face or edge 76 of the stationary duct 28 has a plurality of individual dampers 80 covering its opening 82. The illustrated dampers of the stationary duct 28 are generally in three groups: a first group 84 all having a horizontal centerline 86 and collinear top edges 88, a second group 90 having a centerline 91 intersecting that of the first group but having a top edge 92 at least a part of which is collinear with the top edge 88 of the first group, and a third group 94 having a centerline that is the same as the second centerline 91 but a top edge 96 that intersects the top edge 92 of the second group of dampers.

An example of a damper system that will work with the present invention is illustrated in FIGS. 11–12. Each of these stationary duct dampers 80 closes substantially flush with the bearing surface 76 of the stationary duct 28, and each opens into the interior of the stationary duct so that they do not interfere with the movement of the tilting duct manifold 26 as it slides over the stationary duct. The number of dampers and their positions and orientations and order and timing of their opening and closing should be set to provide a substantially unobstructed path for air flow from the tilting manifold to the stationary duct without drawing in substantial amounts of air from the surrounding environment. To this end, the dampers 80 may be open and shut in sequence, and their flat exterior faces may be juxtaposed with the tilting manifold face of edge 74.

As shown in FIG. 12, each of the individual stationary duct dampers 80 comprises, in the illustrated embodiment, a planar plate 100 mounted to turn about an axle 102. The axles 102 are all off-center of the plates 100 and are parallel to and closer to one longitudinal edge 104 of the stationary duct dampers 80. The axles 102 are mounted for rotation on suitable support structures in the interior of the stationary duct 28. Actuating mechanisms (not shown) may be disposed on the exterior of the stationary duct 28, and connected to the interior side of each damper 80, to pull the damper back into the interior of the stationary duct when the damper is to be opened and to push the damper out so that its planar plate 100 is parallel to and flush with the mating face 72 and bearing surface 76 of the stationary duct when the damper 80 is to be closed. A suitable actuating mechanism may be hydraulically, pneumatically or electrically operable. In the illustrated embodiment, each damper 80 has an angled flange 108 attached along the length of one longitudinal edge 110 opposite the edge 104 nearest the axle 102. The angled flange 108 of one damper 80 closes against the edge 104 of the adjacent damper to limit air leakage between closed dampers while keeping the face 72 of the stationary duct free from any obstruction.

As shown in FIGS. 3–8, the stationary duct dampers 80 are set to open sequentially and in coordination with movement of the furnace as it tilts. Thus, when the furnace is in the upright position, as shown in FIG. 3, the first five stationary duct dampers 80*a*–80*e* are fully open, and air flows freely from the tilting duct manifold 26 to the stationary duct 28. The remaining seven stationary duct dampers 80*f*–80*l* are fully closed so that no extraneous air is drawn into the system 10. As the furnace tilts for tapping to the position shown in FIGS. 5–6, the first dampers 80*a*–80*d* close, damper 80*e* remains open, and dampers 80*f*–80*j* open. Since the stationary manifold 28 is shaped so that the opening 82 angles downward, the shape of the opening 82 complements that of the path of travel of the opening 78 of the tilting manifold 26. Although not shaped as an arc, as the path of travel for the tilting manifold, the changing centerlines and top lines of the stationary opening and its dampers reasonably complements the path of the tilting opening 78. As the furnace is further tilted to the full extent, as shown in FIGS. 7–8, the opening 78 in the tilting manifold travels further, and the stationary dampers 80 of the stationary duct further open and close so that there is an air-flow path 112 through open dampers 80 between the tilting manifold 26 and the stationary duct 28 throughout the entire range of motion of the tilting manifold.

The surfaces of the flanges 70, 72 of the tilting duct manifold 26 and stationary manifold 28 may be oversized so that they are in contact throughout the range of motion of the furnace, to limit the amount of outside air drawn into the system. Preferably, the planar plates 100 of the dampers 80*a*–*l* facing the tilting manifold are substantially flush with the flange 70 of the tilting duct manifold 26 as it slides over the stationary duct to minimize end leakage during tilting.

The actuating mechanisms for the dampers 80*a*–*l* may be set to open and close in response to the angular position of the furnace. There may be sensors such as furnace position resolvers (not shown) provided at the tilting mechanism so that individual dampers open or close when the furnace tilting mechanism is at a particular position. Preferably, the dampers 80*a*–*l* are controlled to begin opening while still covered with the tilting flange 70 so that the dampers are fully open when aligned with the opening 78 in the tilting duct manifold 26 to maximize the volume of air pulled through into the stationary duct 28. Thus, the extended flange 72 shown in FIG. 11 for the tilting duct manifold bearing surface is preferred. Dampers suitable for use as stationary duct dampers are made by Control Equipment Co., Inc. of Schaumburg, Ill. and designated as Fume Collecting Duct Tilting "Y" Dampers. The tilting mechanism for the furnace may be as typical in the art.

In contrast to the stationary duct dampers 80, which operate in an open or closed position, the door damper 64 and electrode hood dampers 60 may be variable position dampers, to provide various levels of restriction to flow by varying the size of the pathway for air and the orientation of a surface in the pathway. Preferably, to maximize efficiency it is preferred that the door damper and electrode hood dampers be dynamic so that the positions may be changed during furnace operation. These levels of restriction and pathway size and shape variations may be based upon operating conditions or other variables. Various types of dampers may be employed for the door damper and electrode hood dampers. Examples are illustrated in the accompanying FIGS. 14–17. Both types of dampers are available from Control Equipment Co., Inc. of Schaumburg, Ill. as a Model RF—Rectangular Butterfly damper and as a Model MVD Multi-Vane Opposed damper.

Figure 14:
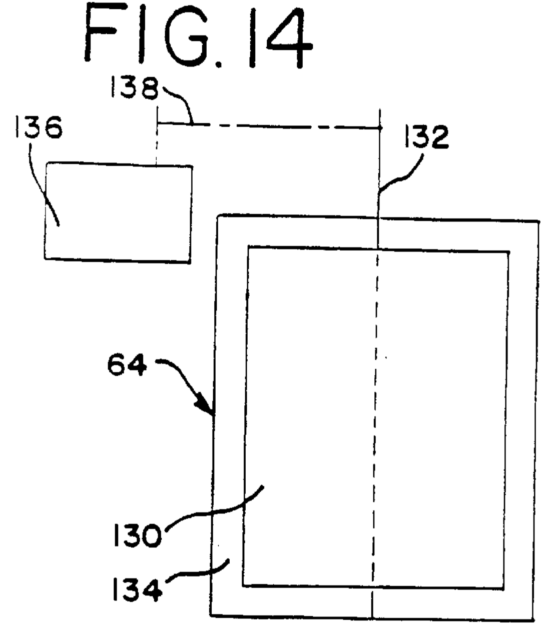
FIG. 14 is an elevation view showing a suitable door damper for use in the present invention.

A door damper 64 that may be used with the present invention is illustrated in FIG. 14. As there shown, the door damper 64 may comprise a single butterfly damper such as an airfoil vane 130 mounted for rotation on a central longitudinal shaft 132. The airfoil vane 130 may be closed against a frame surface 134 that fits within the door duct 62. The shaft 132 may be mounted so that the airfoil vane can be swung through and set at a variety of positions. Such a variable damper is preferred for the door, since it is preferable to have greater control and options available than would be provided by a mere open or closed damper. The damper may be moved by an actuator 136 such as an electronic Beck actuator number 11-208-125-20. A suitable linkage 138 for operably connecting the actuator to the shaft 132 for turning the airfoil vane 130 to the desired positions may be employed. The material used should be capable of withstanding the operating conditions in the door duct, including the temperature, pressure, fumes and particulate; 304 stainless steel may be appropriate as temperatures may be expected to range to above 600 degrees Fahrenheit, and pressure differences to range to about 20 inches of water. This same type of damper may be used for the spout hood damper 144 at the spout hood 24 with an open or closed type of actuator, shown as 139 in FIG. 15, where like numbers have been used for like parts.

Figure 16:
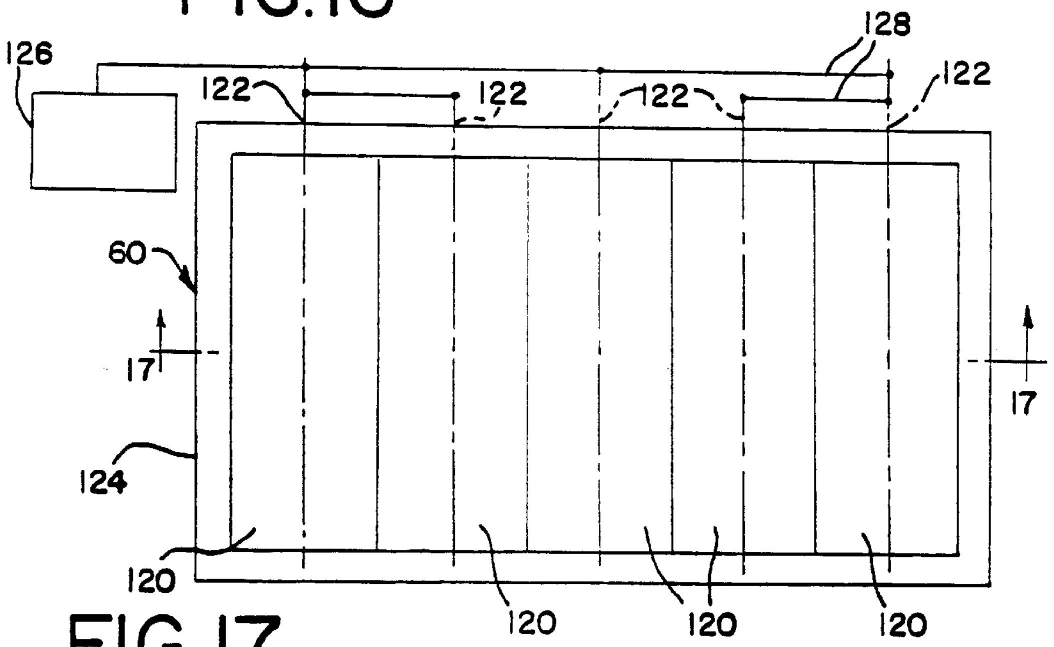
FIG. 16 is side elevation view of a group of dampers suitable for use as an electrode hood damper with the system of the present invention.
Figure 17:
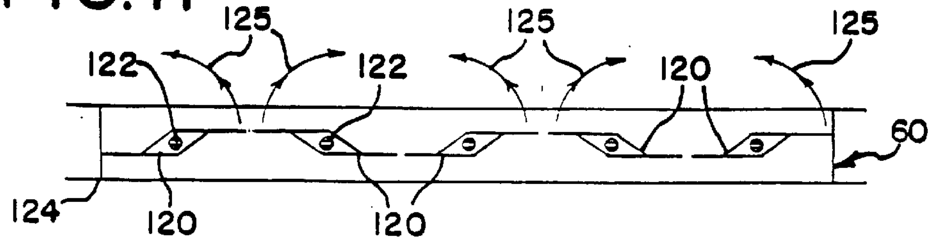
FIG. 17 is a cross-section taken along line 17—17 of FIG. 16.

A suitable electrode hood damper structure 60 that may be used with the present invention is illustrated in FIGS. 16–17. As there illustrated, the electrode hood damper 60 may comprise a plurality of airfoil vanes 120, each mounted for rotation on a shaft 122. The vanes and shafts are mounted on a frame 124 that is set between the tilting manifold 26 and the electrode hood 50, upstream of the bearing face 74 of the tilting manifold. An electric actuator 126 may be used to rotate the shafts 122 to turn the vanes 120 to the desired positions. In the illustrated embodiment, the electric actuator 126 is connected to a system of linkage arms 128 that serve to move all of the individual airfoil vanes to the desired positions. The illustrated vanes 120 open in the directions shown by the arrows 125 in FIG. 17. The materials selected should be suitable for the anticipated operating conditions, such as temperatures up to about 1,800 degrees Fahrenheit, pressure differentials of up to negative 20 inches of water, and the effects of exposure to the emissions over long periods of time; 330 stainless steel is expected to be a suitable material.

As shown in FIGS. 3, 5, 7, and 19, the tilting manifold 26 is also connected to a spout hood duct 140 that is connected to draw air from the spout hood 24. The spout hood 24 is movable with respect to the spout 42 and with respect to the spout hood duct 140 so that the spout may be maintained without interference from the spout hood. The spout hood duct 140 includes a first fixed portion 142 that is fixed to the tilting manifold 26 so that it tilts with the furnace. The first fixed portion 142 has a spout damper 144 and a planar flange 145.

Figure 19:
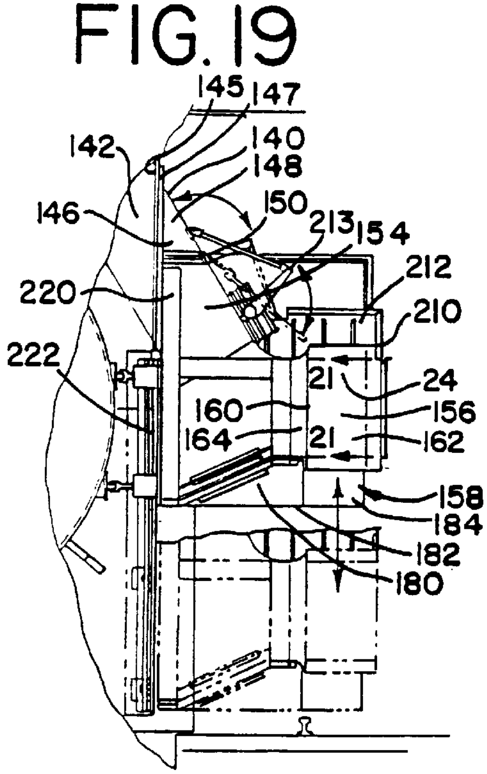
FIG. 19 is a top plan view of a furnace with spout hood in accordance with the present invention.

The spout hood duct 140 also includes a second slidable or movable portion 146 that slides or rolls with the spout hood 24 away from the spout 42. The second slidable portion 146 includes a planar flange 147 that abuts the planar flange 145 of the first portion when the first and second portions are connected. This juncture of the flanges 145, 147 comprises a parting line for the fixed and slidable or movable portions of the spout hood duct. As shown in FIG. 19, the second portion 146 also includes a nose 148 pivotable about a hinge 150; the nose is generally shaped like a right triangle in top plan view, as shown in FIG. 19, with the longer leg of the triangle being along the flange 147, and the hinge being at the juncture of the shorter leg and the hypotenuse. The second slidable portion 146 of the spout hood duct 140 also has a main duct portion 154 that extends from the flange 147 to a main spout hood 156 with an intake for capturing ladle emissions. The main duct portion 154 is also connected to a side hood 158 depending like a saddle-bag from one side of the main hood.

Figure 20:
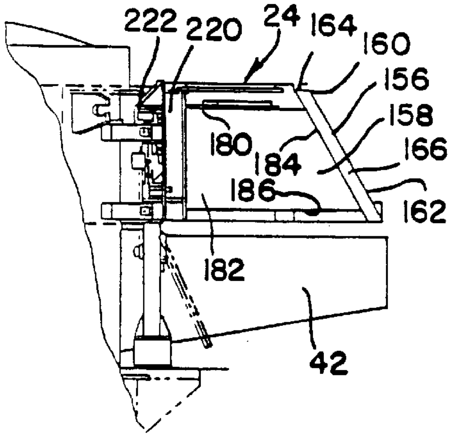
FIG. 20 is a side elevation of the spout hood of FIG. 18.

As shown in FIGS. 18–23, the main spout hood 156 has an edge 160 around the perimeter of its main intake opening 162, a top wall 164, side walls 166, 168 and a bottom wall 170. The edge 160 at the side walls 166, 168 defines an acute angle with the plane of the top wall 164, as shown in FIG. 20, so that the edge 160 is aligned with the vertical axis 172 of the ladle when the furnace is fully tilted as shown in FIG. 8.

Figure 21:
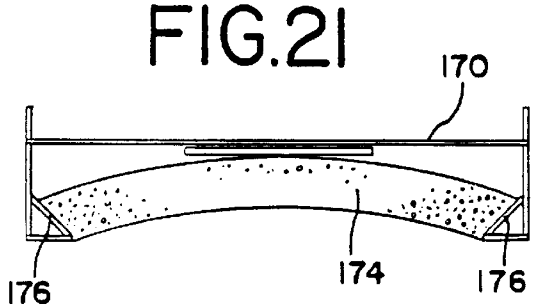
FIG. 21 is a view of the bottom wall of the spout hood of FIG. 19, taken along line 21—21 of FIG. 19.

The bottom wall 170 of the main spout hood 156 is normally positioned directly above the spout when the spout hood is positioned to draw emissions from the spout and ladle during tapping. Accordingly, the bottom wall 170 is subject to extremely high temperatures. To protect the bottom wall from these temperatures, its underside preferably has a refractory lining 174 as shown in FIG. 21. As there shown, the refractory 174 is cast in place to define a concave surface in cross section. Angled sides 176 may support the longitudinal edges of the refractory lining 174.

The main spout hood 156 is sized to draw emissions from the ladle below the spout. However, the ladle generally has a larger diameter than the width of the spout. The side hood 158 is provided to collect fumes rising up from the ladle beyond one side of the main spout hood. In the illustrated embodiment, the side hood 158 is attached to one of the side walls 166 of the main spout hood 156. The illustrated side hood 158 has a top wall 180, a side wall 182, a front wall 184, and a side hood intake opening 186 that opens downward. The bottom opening 186 is sized and positioned to overlie the portion of the ladle beyond the main spout hood 156, so that emissions rising from the ladle and the spout 42, as diverted by the refractory lining 174 of the bottom wall 170 of the main spout hood 156, enter the intake opening 162 and the side hood intake opening 186.

Figure 22:
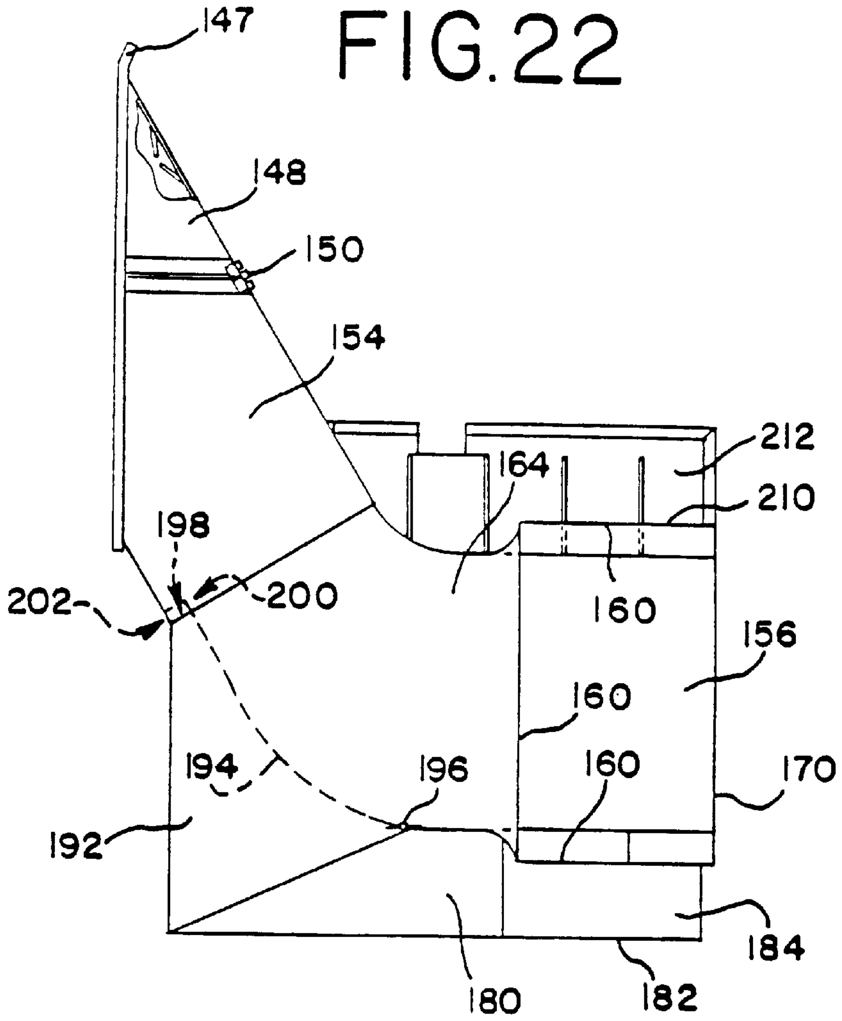
FIG. 22 is an enlarged partial top plan view of the spout hood of the present invention.
Figure 23:
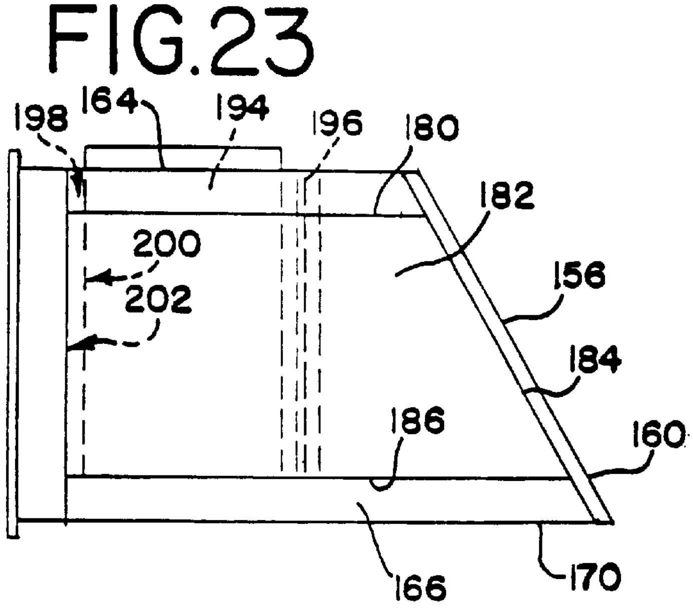
FIG. 23 is an enlarged side elevation of the spout hood of the present invention.

As shown in the detail views of FIGS. 22 and 23, the side hood 158 is connected to the main duct portion 154 through a side duct 192. The connection between the side duct 192 and the main duct portion 154 is partially blocked by an internal diverter 194. The internal diverter may be a curved surface with two longitudinal edges parallel to the central vertical axis of the furnace. The internal diverter 194 may be connected to the main duct portion 154 by a hinge along one side edge 196, leaving a small gap 198 between the opposite edge 200 of the internal diverter 194 and the wall 202 of the side duct 192. It may also be desirable to fix the internal diverter 194 to provide a constant space or gap for air flow after the optimum distance has been determined. This arrangement may be expected to create very low hood entry energy losses.

Generally, for efficiency, the gap 198 should be set to provide a minimum air volume that controls the dust rising from the ladle and spout. In determining this optimum gap 198, it may be desirable to provide some access to the internal diverter to determine the proper gap for the installation. For example, the internal diverter 194 could be set to an initial position and then adjusted by trial and error to determine the preferred size of the gap for that installation. It is not, however, necessary to provide a hinged damper: once a desirable gap is determined, the internal diverter may be left in position, or it can be made with a set gap 198 of, for example, two to four inches.

On the opposite side 210 of the main spout hood 156 the illustrated embodiment of the present invention has a horizontal external deflector 212. The illustrated external deflector 212 is in the same plane as the bottom of the main spout hood. The spout hood external deflector 212 is provided to overlie the portion of the ladle on the opposite side of the main hood, to block the fumes rising from the ladle so that the emissions can be collected by the side hood. Alternatively, a second side hood could be positioned on the opposite side 210 of the main hood, but in the illustrated embodiment, such a side hood would not fit with the nose portion of the duct when the nose portion is pivoted open as shown in FIG. 19.

To pivot the nose portion 148 of the slidable or movable portion 146 of the spout hood duct, an actuator 213 may be supplied, as shown in FIG. 19. The actuator may be powered by a motor or other powered device, such as a pneumatic or hydraulic actuator. The size and shape of the nose portion may vary depending on the environment in which the system is used. Generally, the illustrated foldable nose portion is provided so that when the spout hood assembly is slided or rolled to one side to allow spout access and maintenance, a portion of the spout hood assembly may be folded back upon itself so that the spout hood does not extend beyond the furnace platform.

Figure 15:
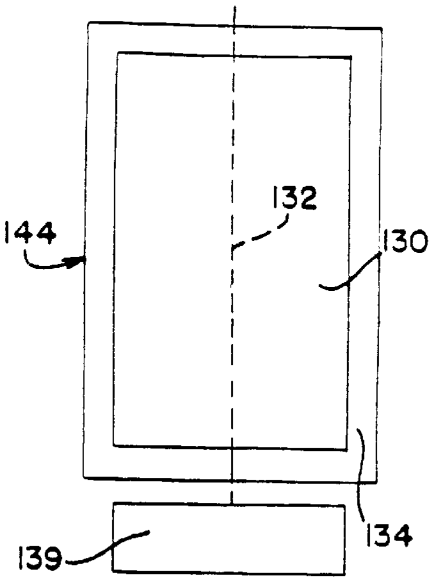
FIG. 15 is an elevation of a suitable spout hood damper for use in the present invention.

The spout damper 144 may be of the butterfly type shown in FIGS. 14–15 for the door damper 64. However, it is preferred that the damper be set to be either open or closed rather than of variable positioning. Accordingly, a pneumatic actuator may be used instead of the electric actuator 136 used for the door damper.

Figure 26:
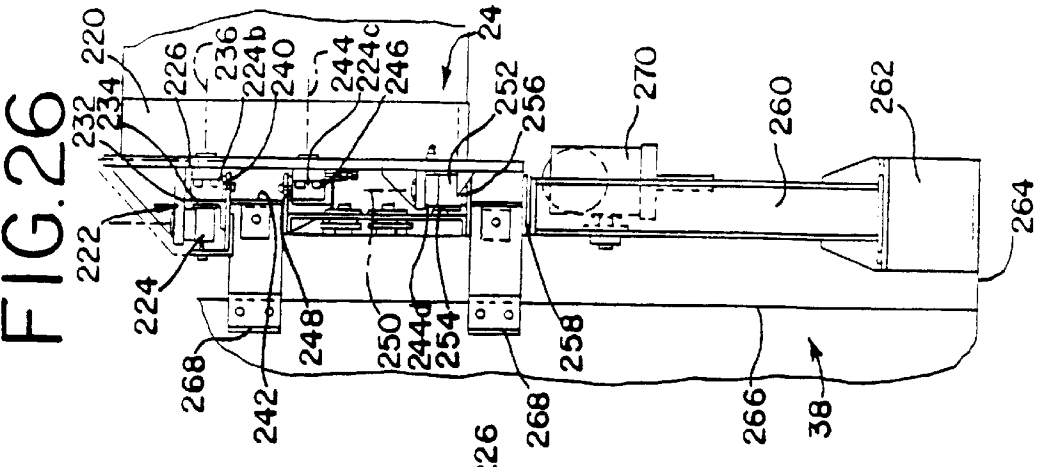
FIG. 26 is an end elevation of the track system of FIGS. 24 and 25.
Figure 24:
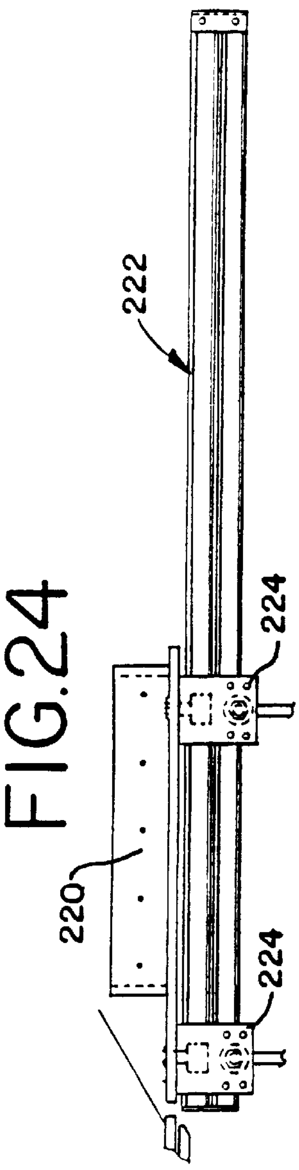
FIG. 24 is a top plan view of a track system for mounting the spout hood of the present invention on a furnace crucible.
Figure 25:
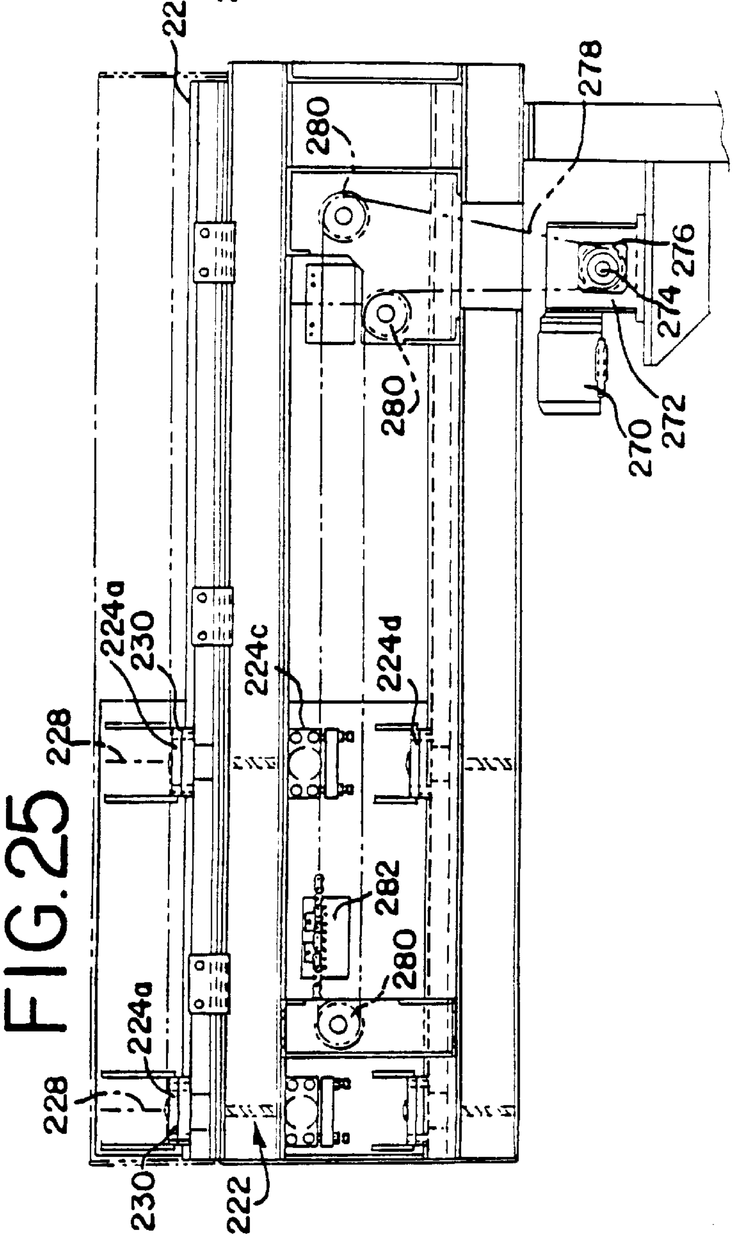
FIG. 25 is a front elevation of the track system of FIG. 24.

The spout hood and the slidable or movable portion of the spout hood duct may be supported by a rigid frame 220 mounted for reciprocal sliding or rolling movement on a track assembly 222. As shown in FIG. 26, the rigid frame 220 may be connected to the spout hood and to a plurality of cam roller assemblies 224. In the illustrated embodiment, there are four pair of spaced cam roller assemblies 224, at different orientations and at different vertical levels.

One pair of cam roller assemblies **224*a*, at a top vertical level 226, is oriented so that the axes 228 of the cam rollers 230 are vertical. These first cam roller assemblies 224*a* bear against a vertical surface of a track plate 232 mounted on an angle 234. The two cam rollers are also horizontally spaced. The vertical bearing surface of the track plate 232 is between the cam rollers 230 and the frame 220**.

The next pair of cam roller assemblies **224*b* is oriented at a right angle to the first pair 224*a*, so that the axes 236 of the rollers 238 are horizontal. The rollers 238 bear against a horizontal track plate 240 beneath them and mounted on an I-beam 242**.

The next pair of cam roller assemblies **224*c* is oriented parallel to the second pair 224*b*, so that the axes 244 of the rollers 246 are horizontal. The rollers 246 bear against a horizontal track plate 248 above them on the I-beam 242**.

The fourth pair of cam roller assemblies **224*d* is oriented at a right angle to the second and third pairs, and parallel to the first pair 224*a*, so that the axes 250 of the rollers 252 are vertical. The rollers bear against a vertical track plate 254 mounted on a fourth angle 256. The fourth cam roller assembly 224*d* is positioned between the track plate 254 and the rigid frame 220** of the spout hood.

The four sets of cam roller assemblies **224*a*–224*d* and their associated track plates 232, 240, 248, 254, oriented as described, serve to allow the spout hood frame 220** to move or roll back and forth along the track plates as desired without tipping over or slipping down or bouncing up.

The fourth angle 256 is mounted on a lower I-beam 258 that is supported at its two ends by upright posts 260 supported on beams 262 on the furnace platform 264. The two I-beams 242, 258 are spaced from and attached to the side 266 of the furnace crucible 38 by angles 268.

To move the spout hood assembly back and forth on the track assembly the illustrated embodiment includes a motor 270 and worm gear reducer 272 to drive an output shaft 274 that rotates a chain sprocket 280. The rotating chain sprocket 280 and idler sprockets drive a continuous chain 278 that traverses a substantial part of the length of the track assembly. A connecting member 282 may be provided between the chain 278 and the spout hood frame 220 so that as the chain 278 travels the spout hood is moved with it.

From the foregoing, it should be understood that the present invention provides for more efficient air processing in environments wherein an arc furnace is used. One aspect of the increased efficiency is from the continual connection of the door hood and electrode hood to the fan system. Another aspect of the increased efficiency is from the various damper systems that provide for air to be drawn from areas where it is most needed, rather than from all areas at all times. Still further efficiencies may be achieved by using a variable speed fan so that fewer cubic feet per minute of air will be moved when the system is operating at a point where emissions are lower or where the emissions are only from a limited area.

Figure 29:
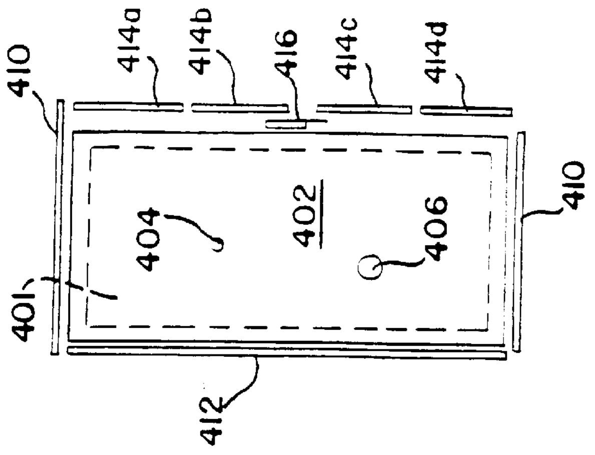
FIG. 29 is a top plan view of the hopper containment assembly of FIG. 26.
Figure 27:
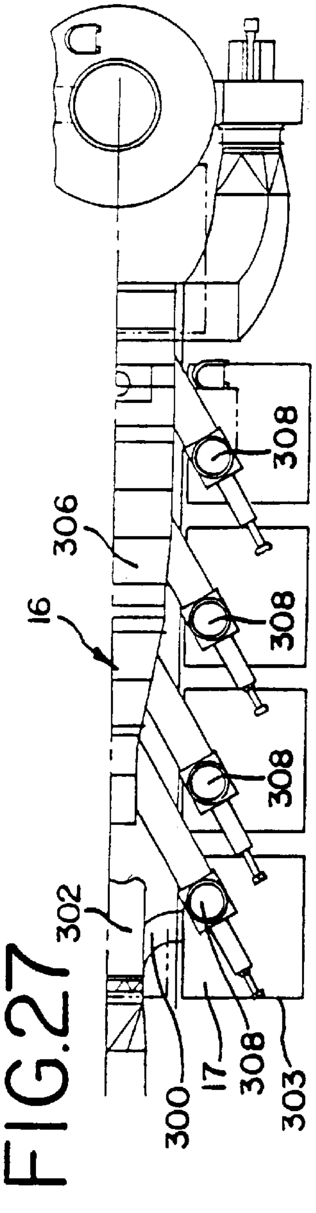
FIG. 27 is a partial top plan view of a bag house with parts removed for clarity of illustration.
Figure 28:
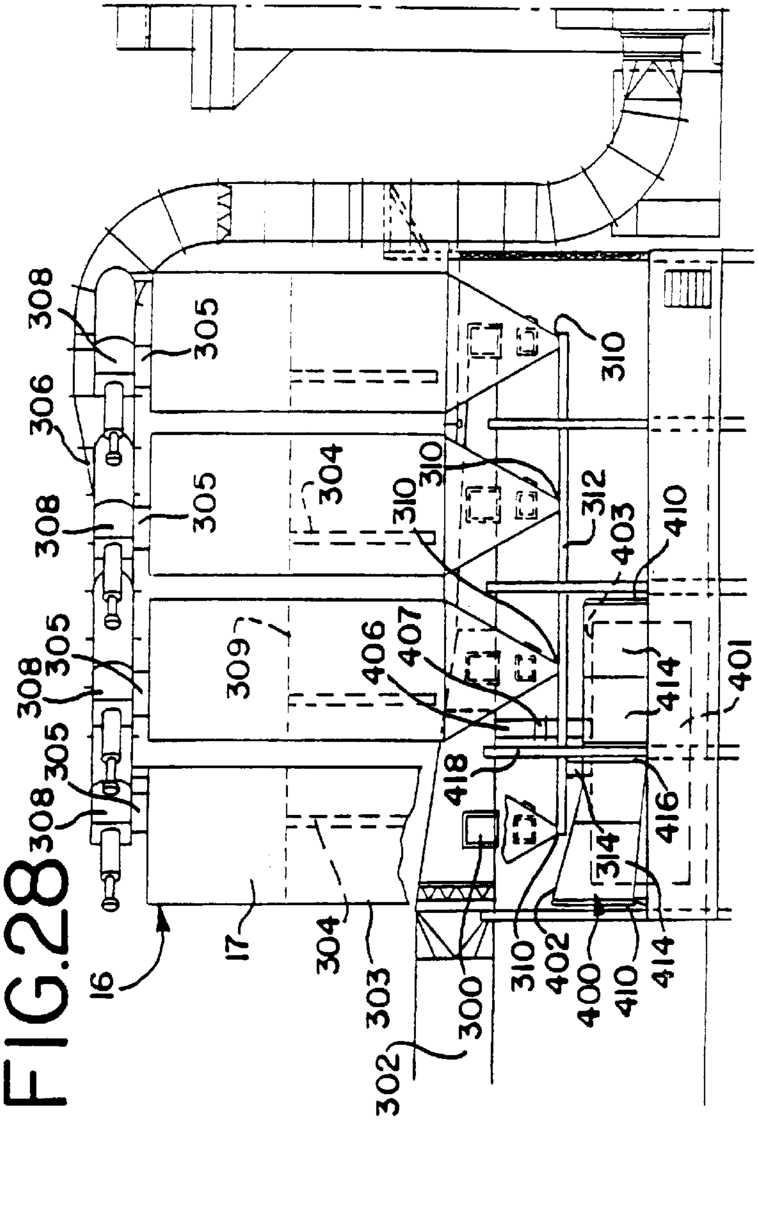
FIG. 28 is a side elevation of the bag house of FIG. 25 with parts removed for clarity.

Another efficiency may be gained through use of a controlled damper system in the bag house. As illustrated in FIGS. 27–29, in a typical bag house 16, there are a plurality of bag collector assemblies 17 each with an inlet 300 from a manifold or air supply duct 302 downstream of the common duct 14. Within each bag collector outer compartment 303 are a plurality of filter bags 304 connected at their upper ends to a horizontal plate 309 then to a clean air outlet duct 305 leading to an outlet manifold 306. An outlet damper 308 is provided at the top end of each common duct 305, between the filters and the outlet manifold 306. The outlet dampers 308 may be of the open-close variety; they may be poppet dampers of the type having a sliding plate either blocking or allowing flow from the filters to the outlet manifold; the details of the dampers 308 are not illustrated since those in the art will recognize that any type of damper may be used at this juncture, with a suitable actuator (not shown). The collector outlet damper 308 actuators may be controlled by the programmable logic controller element 500 to open and close in response to pressure differentials as described below.

At the bottom of each collector compartment 303 is a dust outlet 310 connected to a dust conveyor 312, such as a screw feed, for example, which is connected to all of the dust outlets from all of the bag collector assemblies; another lateral connection may be provided between parallel rows of collectors. The dust conveyor 312 has a common dust discharge 314. The dust manifolds may have screw feed mechanisms (not shown) for moving the dust toward the discharge. From the discharge, the collected dust may be dropped into a roll off hopper 401 positioned below the discharge, where the dust is accumulated and disposed of.

Since there is a possibility of dust escaping into the environment at the common dust discharge, it may be desirable to enclose the entire bag house and provide a canopy exhaust system leading back into the inlet manifold for treatment, or a collector may be provided at the common dust discharge 314. Alternatively, a hopper dust containment assembly 400 may be provided at the dust discharge 314. In the illustrated embodiment, the hopper dust containment assembly 400 comprises a roof 402 supported beneath the collectors 303 at the common discharge 314 and above the hopper 401. The roof 402 has two openings, one 404 through which the dust conveyor 314 extends and another for a containment assembly air exhaust duct 406 connected through an open/close damper 407 to the intake manifold or air supply conduit 302 downstream of the collector assemblies 17. The roof 402 is surrounded by curtains extending to the level of the hopper. The roof 402 and curtain define a dust containment area, the outlet end for the waste conveyor or dust discharge 314 is within the dust containment area, substantially surrounded by the roof and the curtain. As shown in FIGS. 28 and 29, the hopper dust containment assembly 400 has two end curtains 410 and a stationary side curtain 412 enclosing three entire sides of the roof 402. Along the access side of the roof, the hopper dust containment assembly's curtain is an access curtain in four sections 414*a–d*. The four sections of the access curtain may be moved back and forth to allow access to the hopper 401 so that it may be raked or other maintenance performed in the hopper area. A smaller reinforced curtain element 416 is present between the second 414*b* and third 414*c* access curtains in the vicinity of one of the upright support elements 418 for the exterior walls of the bag house. All of the curtain elements may be suspended from a pipe, rope or cable (not shown) surrounding the roof on any suitable support element, such as on sets of rollers or rings. The access curtains 414 should be movable along the rope so that a worker may have access to the hopper 401. The access curtains may have rigid push-pull rods on each end to facilitate movement of the curtains. The curtains 410, 412 may have pipes attached to the bottom ends or weights or may be tied down to reduce undesired fluttering or other undesired movement of the curtains. The rope or cable from which the curtains are hung may be one-quarter inch diameter cable, such as nylon coated wire rope, for example; use of such a product provides a smaller horizontal surface on which the dust may settle to undesirably interfere with lateral rolling movement of the curtains. The two end curtains 410 may be made to roll up on themselves or otherwise moved vertically so that they may be readily moved out of the way when it is time to move the hopper 401 into or out of the bag house.

In the illustrated embodiment, the roof is rigid, being made of 10 gauge plate steel. The curtains are flexible, made of vinyl coated fabric, and are hung so that the bottom edge of the curtain overlays the top rim 403 of the hopper 401; in the illustrated embodiment, the floor underneath the bag house is sloped, and the bottom of the curtain is five feet from the floor of the bag house to ensure that the hopper 401 is completely covered. The roof and the curtain define a dust containment area. The hopper is movable on the floor into and out of the dust containment area.

The damper 407 for the containment assembly air exhaust duct 406 leading out of the hopper dust containment assembly 400 may be connected to a manual switch; it may also be actuated by an automatic actuator connected to the central programmable logic controller 500 (FIG. 30) that controls the remainder of the system. In the illustrated embodiment, there is a manual button that the operator may actuate to open the damper 407 when the operator intends to rake the contents of the hopper 401 or move the hopper for example; preferably, the damper 407 would be timed to remain open for some period after its switch is actuated, as for example, to remain open for a ten minute interval. The damper 407 may also be actuated by an actuator controlled by the programmable logic element 500 so that the actuator opens the damper 407 when the bags are pulse cleaned and so that the damper remains open for some time period after the pulse cleaning. The damper 407 may also be actuated to open automatically after the fan 18 has been at high speed and then drops to a lower speed thus releasing dust from the filter bags; it may be desirable to maintain the damper 407 open for a ten minute interval after this change in fan speed.

There may be more than one fan 18 provided in the bag house to draw air so that there is a fail safe mechanism in place should one of the fans become inoperative.

When the emission-laden air is received in the bag collector assembly 17, the fan draws the air through the filters 304 which filter most of the dust out from the air; and the filtered air is drawn up through the filters, past the outlet damper 308 and into the outlet manifold 306. However, as dust accumulates on the dirty air side surfaces of the filter bags 304, it becomes more difficult to pull air through the filter bags as time goes by. Typically, such bag collector assemblies are cleaned after a timed interval has elapsed or when a set pressure differential is reached: the outlet damper 308 is closed and pulse cleaning occurs. After all the compartment bags have been pulse cleaned, the damper opens allowing that compartment to resume its filtering operation. The dust on the surface of the filter 304 drops to the bottom of the collector and out the dust outlet 310 into the dust conveyor 312. However, when a variable speed fan is used, the set point for the pressure differential for cleaning the system may not be reached at lower speeds even when the system is very dirty, and when a higher speed is called for, the system will not operate efficiently because the filters are clogged with dust. In the present invention this problem is obviated by setting the clean cycle to commence with a variable pressure differential that is related to the fan speed. Thus, at lower fan speeds, the system is set to clean a collector assembly when a lower pressure differential is reached; at higher speeds, a higher pressure differential is required before the cleaning cycle will commence.

Examples of suitable pressure differentials and fan speeds are provided in the following table, where "ΔP" refers to the pressure drop across the filter media, "CFM" refers to cubic feet per minute of air moved by the fan and "RPM" refers to the fan speed in revolutions per minute:

| Desired ΔP (inches water column) | System Total CFM | Fan Motor RPM |
|---|---|---|
| 6.6" | 155,000 | 1,700 |
| 6.0" | 140,000 | 1,600 |
| 5.6" | 130,000 | 1,490 |
| 5.1" | 120,000 | 1,410 |
| 4.7" | 110,000 | 1,390 |
| 4.3" | 100,000 | 1,210 |
| 3.9" | 90,000 | 1,100 |
| 3.6" | 85,000 | 1,060 |
| 3.0" | 70,000 | 900 |

The formula for these desired ΔP values is as follows:

$$\Delta P = CFM(4.29[10^{-5}])$$

Figure 30:
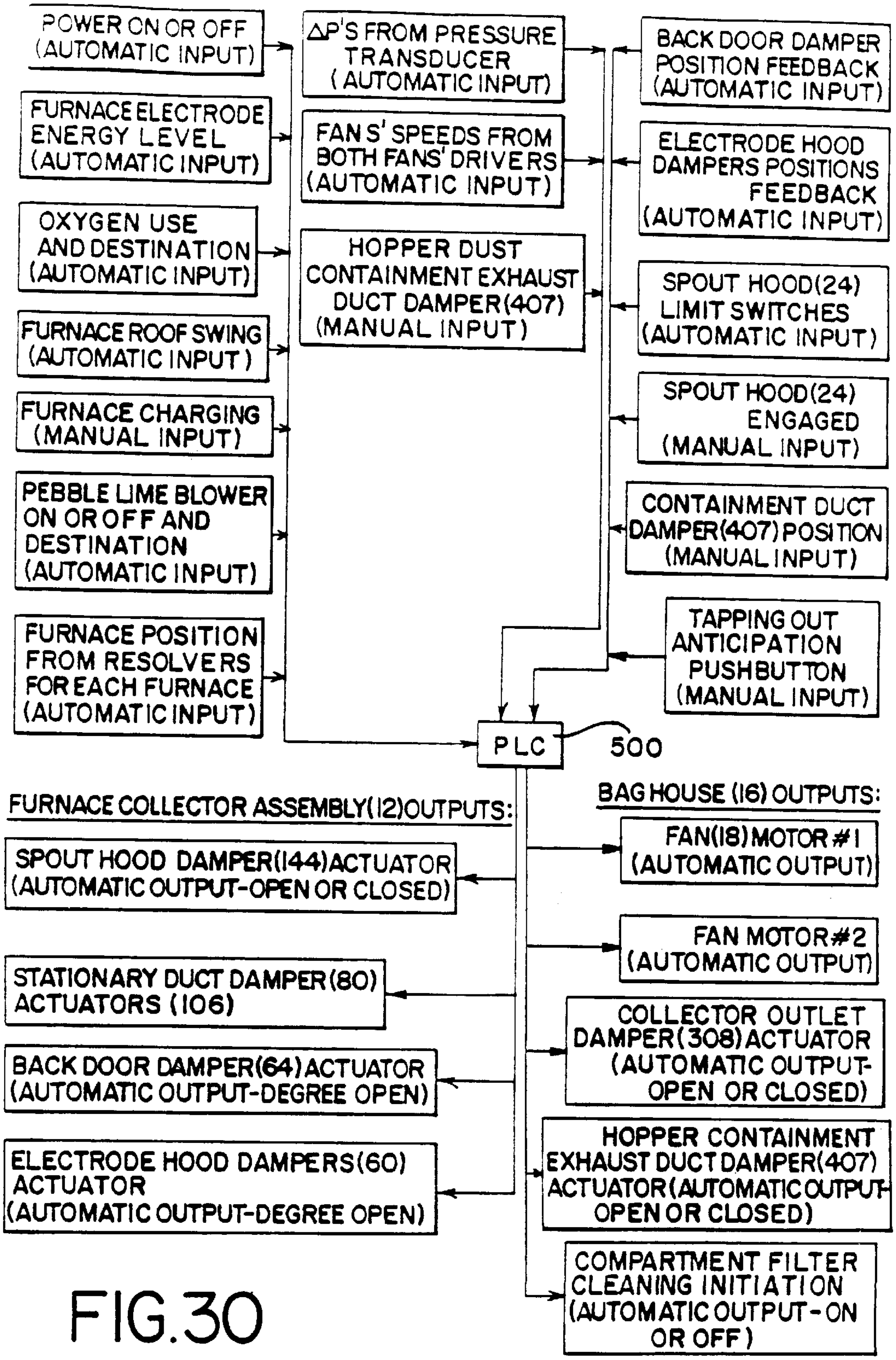
FIG. 30 is a flow chart showing input into a programmable logic controller of the present invention and output from such a programmable logic controller.

To achieve greatest efficiency, it is preferred if a programmable logic controller or element 500 is used to control the operation of the various damper systems in the furnace hood assembly 12, to control the fan 18 speed and to control the operation of the bag collector cleaning mechanism. An example of a suitable system is illustrated in the flow chart of FIG. 30. As there shown, a programmable logic element 500, which may be one supplied by the Allen-Bradley Co., of Highland Heights, Ohio, Lebanon, N.H. and Minnetonka, Minn., Model SCL 5/03 Processor 1746-L534, with ICOM SCL500 programming software, catalog no. S5-300C and with an Allen Bradley PC to SLC500 converter catalog no. 1746-PIC. It should be understood that these elements are identified for purposes of illustration only, and that other controllers may be useful with the present invention. As shown in FIG. 30, the illustrated programmable logic controller 500 receives inputs from the two furnaces, including the oxygen and pebble lime blower controls, the furnace hood assembly 12, from the variable speed fan drives and from the bag house controls.

Preferably, furnace system input for the programmable logic controller element may come from one furnace 30, or preferably from two furnaces sharing a common stationary duct 28, giving an indication of: whether the furnace power is on or off; the furnace electrode 32 energy level (a "tap 1" or "tap 2 or 3" indication, for example); oxygen use (for example, for lancing); whether the pebble lime blower (not shown) is operating and to which furnace it is directed; whether the furnace roof 36 is swung (for example, by manual pushbutton or automatic input); whether charging is taking place (for example, by manual pushbutton input); and furnace tilt position from a resolver for each furnace by automatic input. Furnace hood assembly 12 inputs may come from spout hood 24 limit switches, from a manual input indicating that the spout hood 24 is engaged and from position feedback for the door damper 64 and electrode hood dampers 60. Input may also come from the bag house 16, including, for example: an automatic input of pressure differentials between the clean and dirty sides of the filter bags 304 through the use of a pressure transducer; an automatic input of fans' 18 speeds from each fan drive motor; and manual input may be provided for the dust containment assembly air exhaust duct damper 407, entered by the operator when undertaking some activity such as raking the hopper contents.

The limit switches to sense the position of the spout hood 24 may be obtained from Telemacanique as part no HL300WS2M, with activating arm part no. CC and mounting plate by CEC Products as part no. 3ZF-9528-8 (FORD #). Suitable variable speed fan motor drives may be obtained from Allen-Bradley as model 1336 VT-B250P-EFJP-EPR-PG2-250CB.

Furnace tapping out, or pouring, anticipation pushbuttons may be provided to allow dampers and fan speeds to reach desired settings before the spout hood engages so its performance peak does not have to await the 20–40 second damper-fan change reaction time.

The output from the programmable logic controller element may be to the furnace hood assembly 12, as shown in FIG. 30, to, for example: energize the actuator for the spout hood damper 144, to either open or close the damper; to successively open or close the individual stationary dampers 80*a*–80*l* by energizing the actuators; to adjust the degree to which the door damper 64 is open by energizing the door actuator; and to control the degree to which the electrode hood dampers 60 are open by energizing the electrode hood damper actuators. Elements of the system in the bag house 16 may also be controlled: the fans' 18 motors may be controlled to set the speed at which the fans 18 rotate; the collector outlet dampers 308 may be closed by energizing their actuators; the compartment filter cleaning initiation may be energized; and the containment assembly air exhaust duct damper 407 may be open or closed or maintained open for a predetermined period of time.

For the resolvers and stationary dampers 80*a*–80*l*, it may be desirable to operate the twelve dampers as follows, assuming a resolver shaft to furnace tilt angle ratio of 4.80 to 1.0, with furnace vertical at 0°, with the furnace tilted toward the pit as a positive angle and the furnace tilted away from the pit as a negative angle:

| Damper Blade | Resolver Shaft Angle Range for Open Damper Blades (°) |
|---|---|
| 1 | −72 to +22 |
| 2 | −53 to +41 |
| 3 | −34 to +64 |
| 4 | −26 to +84 |
| 5 | −12 to +106 |
| 6 | +6 to +144 |
| 7 | +23 to +168 |
| 8 | +38 to +194 |
| 9 | +55 to +219 |
| 10 | +75 to +242 |
| 11 | +93 to +260 |
| 12 | +115 to +260 |

It should be understood that these angle ranges are given for purposes of illustration only; angles may vary depending on the furnace and the number and position and shapes of the dampers and the geometry of the ductwork and furnace.

Preferably, the next succeeding damper opens before the moving tilting manifold opening 78 reaches it so that it provides an air flow path immediately when the opening of the tilting manifold is positioned next to it.

A suitable resolver is available from the Allen Bradley Co. as model number 846-SJDN2CG-R3-C with adapters and Allen Bradly Co. Interface Cards no. AMCI1531.

The volumes of fumes emitted through the electrode roof openings 34, spout 42, up from the ladle 40 and out of the door 43 and from the juncture of the roof 36 and crucible 38 vary throughout the process. For example, the furnace not tapping out in a two furnace system is typically running at a low energy level, with no activity at the door or pebble lime intake pipe, with nothing being poured from the spout, and consequently with lower levels of emissions at the openings of that furnace. As the electrodes 32 are energized to heat the contents of the crucible, the volume of fumes emitting through the electrode openings 34 and interface of the roof and crucible may increase. As oxygen is introduced through lancing through the door 43, a large increase in dust may be emitted through the door 43. As pebble lime is added through the pebble lime intake pipe 46, a large increase in dust emission may be generated inside the crucible. As the furnace is tapped, only a light fume may be emitted through the electrode holes 34 but a substantial volume of fumes can be at the spout 42 and may arise from the ladle 40 and spout. When the spout is not in use, it may be necessary to reline it with refractory or undertake some other repair work. Control of the variable dampers for the electrode hood and door for a two furnace system may be as follows, using the word "tap" to refer to any of the tap energy levels 1–3 of the furnace electrodes (unless otherwise noted, a furnace is not receiving oxygen or lime and metal is not being tapped out of the spout; in this example, furnace no. 1 has a spout hood and furnace no. 2 does not have a spout hood):

State 1: With furnace no. 1 at the tap 1 and furnace no. 2 at the tap 2 or 3 energy level, the electrode hood damper and door damper for the first furnace may be open 100%, with the electrode hood dampers and door damper for furnace no. 2 at 65% open, and the fan speed at 62.60% of maximum speed. In this setting, the first furnace is the dominant furnace.

State 2: With furnace no. 1 at tap 2 or 3 energy level and furnace no. 2 at the tap 1 level of energizing the electrodes, the electrode hood and door dampers for the first furnace may be at 65% and the electrode hood and door dampers for the second furnace at 100% and the fan speed at 62.50% of maximum speed.

State 3: With furnace no. 1 at the tap 1 energy level and furnace no. 2 at the tap 2 or 3 energy level and with the oxygen line open for oxygen lancing, for example, all of the adjustable variable dampers for both furnaces may be at 100% and fan speed may be at 92.50% of maximum speed.

State 4: With furnace no. 1's oxygen line open and its energy level at tap 2 or 3, and with furnace no. 2's energy level at tap 1, all of the adjustable variable dampers for both furnaces may be at 100% and fan speed may be increased to 92.50% of maximum speed.

State 5: With furnace no. 1 at the tap 1 energy level and furnace no. 2 at the tap 2 or 3 energy level but with lime being blown into furnace no. 2, furnace no. 1's adjustable variable electrode hood dampers and door damper may be at 100% open and furnace no. 2's adjustable variable electrode hood and door dampers at 95% and the fans speed at 92.50% of maximum.

State 6: With furnace no. 1 receiving lime and being at the tap 2 or 3 energy level, and furnace no. 2 at the tap 1 energy level, furnace no. 1's electrode hood and door dampers may both be at 95% and furnace no. 2's electrode hood and door dampers at 100% with the fans' speed at 92.50% of maximum speed.

State 7: With furnace no. 1 at the tap 1 energy level and the oxygen line to it open, and furnace no. 2 at the tap 2 or 3 energy level and lime being blown into furnace no. 2, furnace no. 1's electrode hood and door dampers may be open 100% and furnace no. 2's electrode hood and door dampers may be open 70%, and the fans' speed at 93% of maximum speed.

State 8: With furnace no. 1 receiving pebble lime and at the tap 2 or 3 energy level, furnace no. 2 at the tap 1 energy level and receiving the oxygen, furnace no. 1's electrode hood and door dampers may be at 80% and furnace no. 2's electrode hood and door dampers may be at 100% and the fans' speed may be at 93% of maximum speed.

State 9: With furnace no. 1 at the tap 1 energy level and receiving the oxygen, and furnace no. 2 at the tap 2 or 3 energy level, receiving both oxygen and lime, both furnace no. 1's and furnace no. 2's electrode hood and door dampers may be at 100% open, and the fans' speed may be at 92.50% of maximum speed.

State 10: With furnace no. 1 at the tap 2 or 3 energy level and receiving lime and oxygen, and furnace no. 2 at the tap 1 energy level and receiving oxygen, both furnaces may have their electrode hood dampers and door dampers open 100% and the fans' speed may be at 92.50% of maximum.

State 11: With furnace no. 1 at the tap 2 or 3 energy level and furnace no. 2 at the tap 1 energy level and receiving oxygen, furnace no. 1's electrode hood dampers may be open to 50% and its door damper may be open to 30%, and furnace no. 2's electrode hood and door dampers may be open 100% and the fans' speed may be at 93% of maximum.

State 12: With furnace no. 1 at the tap 1 energy level and receiving oxygen, and furnace no. 2 at the tap 2 or 3 energy level, furnace no. 1's electrode and door dampers may be at 100% and furnace no. 2's electrode hood dampers may be at 50%, its door damper may be at 30%, and the fans' speed may be at 93% of maximum.

State 13: With furnace no. 1 at the tap 2 or 3 energy level and furnace no. 2 having its power off and tapping metal out of its spout, furnace no. 1's and no.2's electrode hoods may be at 30% and their door dampers may be at 15% open, and fans' speed may be at 92.50% of maximum. It should be noted that in this example furnace no. 2 does not have a spout hood but would preferably have one.

State 14: With furnace no. 1's power off and metal being tapped out of furnace no. 1's spout, and with furnace no. 2 at the tap 2 or 3 energy level, furnace no. 1's electrode hood and door dampers may be closed and furnace no. 2's electrode hood dampers may be at 35% open and its door may be at 15% open, and the fans' running at 92.50% of maximum speed. It should be noted that furnace no. 1's spout hood would be positioned over its spout and its damper opened as metal begins tapping out of its spout.

State 15: With furnace no. 1 receiving oxygen at the tap 2 or 3 energy level, and furnace no. 2 at the tap 2 or 3 energy level, furnace no. 1's electrode hood dampers may be at 100% open and its door damper may be at 100% open, furnace no. 2 may have its electrode hood dampers at 70% open and its door at 50% open, and the fans' speed may be at 93% of maximum speed.

State 16: With furnace no. 1 at the tap 2 or 3 energy level and furnace no. 2 at the tap 2 or 3 energy level and receiving oxygen, furnace no. 1's electrode hood damper may be at 70% open, its door damper may be at 30% open, and furnace no. 2's electrode hood damper and door damper may be at 100% open and the fans' speed may be at 93% of maximum speed.

State 17: With furnace no. 1 at the tap 2 or 3 energy level and receiving both lime and oxygen, furnace no. 2 at the tap 1 energy level, furnace no. 1's electrode hood damper and door damper may be at 100% open, and furnace no. 2's electrode hood damper may be at 70% open, its door damper may be at 50% open, and the fans' speed at 92.50% of maximum.

State 18: With furnace no. 1 at the tap energy level and furnace no. 2 at the tap 2 or 3 energy level and receiving oxygen and lime, furnace no. 1's electrode hood damper may be at 65% open and its door damper may be at 45% open, furnace no. 2's electrode hood damper may be at 100% open and its door damper may be at 100% open, and the fans' speed may be at 92.50% of maximum.

State 19: With furnace no. 1 at the tap 2 or 3 energy level and receiving lime, furnace no. 2 at the tap 2 or 3 energy level, furnace no. 1's electrode hood damper and door damper may be at 100% open and furnace no. 2's electrode hood damper may be at 65% open and its door damper may be at 45% open, and the fans' speed may be at 93% of maximum.

State 20: With furnace no. 1 at the tap 2 or 3 energy level and furnace no. 2 at the tap 2 or 3 energy level and receiving lime, furnace no. 1's electrode hood damper may be at 65% open and its door damper may be at 45% open, furnace no. 2's electrode hood dampers and door damper may all be at 100%, and the fans' speed may be at 93% of maximum.

State 21: With both furnace nos. 1 and 2 at the tap 1 energy level, the electrode hood dampers and door dampers of both furnaces may be at 100% open and the fans' speed may be at 74.10% of maximum speed.

State 22: With both furnaces at the tap 2 or 3 energy level, both furnaces' electrode hood dampers and door dampers may be at 100% open and the fans' speed may be at 51.70% of maximum speed.

State 23: With furnace no. 1 receiving oxygen and being at the tap 1 energy level, furnace no. 2 at the tap 1 energy level, furnace no. 1's electrode hood damper and door damper may be at 100% open, furnace no. 2's electrode hood damper may be at 70% open and its door damper may be at 50% open, and the fans' speed may be at 93%.

State 24: With furnace no. 1 at the tap 1 energy level and furnace no. 2 at the tap 1 energy level and receiving oxygen, furnace no. 1 electrode hood damper may be at 65% open and its door damper may be at 45% open, furnace no. 2's electrode hood damper and door dampers may be at 100% open and the fans' speed may be at 93% of maximum.

State 25: With furnace no. 1's roof swung and furnace no. 2 at the tap 1 energy level, furnace no. 1's electrode hood and door dampers may be closed, and furnace no. 2's electrode hood damper and door damper may be at 100% open, and the fans' speed may be at 70% of maximum.

State 26: With furnace no. 1 at the tap 1 energy level and furnace no. 2's roof swung, furnace no. 1's electrode hood and door dampers may be at 100% open, furnace no. 2's electrode hood and door dampers may be closed, and the fans' speed may be at 70% of maximum speed.

State 27: With furnace no. 1 at the tap 2 or 3 energy level and furnace no. 2's roof swung off the crucible, furnace no. 1's electrode hood and door dampers may be at 100%, furnace no. 2's electrode hood and door dampers may be closed, and the fans' speed may be at 70% of maximum speed.

State 28: With furnace no. 1's roof swung and furnace no. 2's energy at the tap 2 or 3 level, furnace no. 1's electrode hood dampers and door damper may be closed, and furnace no. 2's electrode hood damper and door damper may be at 100% open, and the fans' speed may be at 70% of maximum speed.

State 29: With furnace no. 1 being charged and furnace no. 2 at the tap 1 energy level, furnace no. 1's electrode hood damper may be at 100% open and its door damper may be at 100% open, furnace no. 2's electrode hood damper and door damper may be at 40% open, and the fans' speed may be at 92.50% of maximum.

State 30: With furnace no. 1 at the tap 1 energy level and furnace no. 2 being charged furnace no. 1's electrode hood damper and door damper may all be at 40% open, furnace no. 2's electrode hood damper and door damper may all be at 100% open, and the fans' speed may be at 92.50% of maximum speed.

State 31: With furnace no. 1 at the tap 2 or 3 energy state and furnace no. 2 being charged, furnace no. 1's electrode hood damper and door damper may be at 40% open and furnace no. 2's electrode hood damper and door damper may be at 100% open, and the fans' speed may be at 92.50% of maximum.

State 32: With furnace no. 1 being charged and furnace no. 2 at the tap 2 or 3 energy level, furnace no. 1's electrode hood damper and door damper may be at 100% open, furnace no. 2's electrode hood dampers and door dampers may be at 40% open, and the fans' speed may be at 92.50% of maximum.

State 33: With furnace no. 1 at the tap 1 energy level and furnace no. 2's power off, furnace no. 1's electrode hood damper and door damper may be at 100% open, furnace no. 2's electrode hood dampers may be at 30% open and its door damper may be at 40% open, and the fans' speed may be at 88.80% of maximum.

State 34: With furnace no. 1's power off and furnace no. 2 at the tap 1 energy level, furnace no. 1's electrode hood damper and door damper may be at 30% open and furnace no. 2's electrode hood dampers and door damper may be at 100% open, and the fans' speed may be at 88.80% of maximum.

State 35: With furnace no. 1's power off and metal being tapped out of its spout and furnace no. 2 at the tap 1 energy level, furnace no. 1's electrode hood damper and door damper may be closed, furnace no. 2's electrode hood damper may be at 35% open and door damper at 15% open and the fans speed may be at 92.50% of maximum speed. It should be noted that furnace no. 1's spout hood would be positioned over its spout and the spout hood damper opened as metal begins tapping out of its spout.

State 36: With furnace no. 1 at the tap 1 energy level and furnace no. 2's power off and metal being tapped out of its spout, furnace no. 1's electrode hood damper and door damper may be at 40% open, furnace no. 2's electrode hood damper and door damper may be closed and the fans' speed may be at 92.50% of maximum. It should be noted that if furnace no. 2 has a spout hood, the spout hood would be moved into position and its damper opened as metal begins tapping out of its spout.

State 37: With furnace no. 1 at the tap 2 or 3 energy level and furnace no. 2's power off, furnace no. 1's electrode hood damper and door damper may be at 80% open, furnace no. 2's electrode hood damper and door damper may be at 20% open, and the fans' speed may be at 74% of maximum speed.

State 38: With furnace no. 1's power off and furnace no. 2 at the tap 2 or 3 energy level, furnace no. 1's electrode hood damper and door damper may be at 20% open and furnace no. 2's electrode hood damper and door damper may be at 80% open, with the fans' speed at 74% of maximum speed.

State 39: With furnace no. 1's power off and metal being tapped out of its spout and furnace no. 2's power off, furnace no. 1's electrode hood damper and door damper may be fully closed, furnace no. 2's electrode hood damper may be open 20% and door damper may be open 10%, and the fans' speed may be at 74% of maximum speed. It should be noted that furnace no. 1's spout hood would be positioned over its spout as metal begins tapping out and its spout hood damper would be opened.

State 40: With furnace no. 1's power off and furnace no. 2's power off and metal being tapped out of furnace no. 2's spout, furnace no. 1's electrode hood damper and door damper may be open 20%, furnace no. 2's electrode hood damper and door damper may be fully closed. It should be noted that if furnace no. 2 has a spout hood, the spout hood could be activated after it is positioned over the spout and its damper could be opened and an appropriate fan speed could be selected.

State 41: With furnace no. 1's roof swung and furnace no. 2's power off, furnace no. 1's electrode hood damper and door damper may be open 20%, furnace no. 2's electrode hood damper and door damper may be fully closed and the fans' speed may be at 51.70% of maximum speed.

State 42: With furnace no. 1's power off and furnace no. 2's roof swung, furnace no. 1's electrode hood damper may be at 20% open and its door damper at 20% open, furnace no. 2's electrode hood damper and door damper may be fully closed, and the fans speed may be at 51.70% of maximum speed.

State 43: With furnace no. 1 at the tap 2 or 3 energy level and metal being tapped out of its spout, and furnace no. 2's power off, furnace no. 1's electrode hood damper may be 20% open and its door damper fully closed, and furnace no. 2's electrode hood damper may be at 20% open and its door damper at 10% open, with the fans' speed at 74% of maximum speed.

State 44: With furnace no. 1's power off and furnace no. 2 at the tap 2 or 3 energy level and metal being tapped out of its spout, furnace no. 1's electrode hood damper and door damper may be at 20% open, furnace no. 2's electrode hood damper and door damper may be at 20% open, and the fans' speed may be at 92.50% of maximum speed. It should be noted that in this example, furnace no. 2 does not have a spout hood; appropriate changes may be made if a spout hood is used.

State 45: With furnace no. 1 receiving oxygen at the tap 2 or 3 energy level, and furnace no. 2 also receiving oxygen at the tap 2 or 3 energy level, all of the electrode hood dampers and door dampers for both furnaces may be open 100% and the fans' speed may be at 93% of maximum speed.

State 46: With furnace no. 1 at the tap 2 or 3 energy level and receiving oxygen and furnace no. 2 at the tap 2 or 3 energy level and receiving lime from the blower, furnace no. 1's electrode hood damper and door damper may be at 100% open and furnace no. 2's electrode hood damper may be at 70% open, its door damper at 50% open, and the fans' speed may be at 93% of maximum.

State 47: With furnace no. 1 receiving oxygen at the tap 2 or 3 energy level and furnace no. 2 receiving both oxygen and lime at the tap 2 or 3 energy level, all of the electrode hood dampers and back door dampers for both furnaces may be at 100% open and the fans' speed may be at 93% of maximum.

State 48: With furnace no. 1 receiving lime and oxygen at the tap 2 or 3 energy level and furnace no. 2 at the tap 2 or 3 energy level, furnace no. 1's electrode hood damper and door dampers may be set at 100% open, and furnace no. 2's electrode hood damper may be set at 55% open and its door damper may be at 30% open and the fans' speed may be at 93% open.

State 49: With furnace no. 1 receiving lime and oxygen at the tap 2 or 3 energy level and furnace no. 2 receiving oxygen at the tap 2 or 3 energy level, all of the electrode hood dampers and door dampers for both furnaces may be open 100% and the fans' speed may be at 93% of maximum speed.

State 50: With furnace no. 1 receiving lime and oxygen at the tap 2 or 3 energy level and furnace no. 2 receiving lime at the tap 2 or 3 energy level, both furnaces' electrode hood dampers and door dampers may be 100% open and the fans' speed may be at 93% of maximum speed.

State 51: With furnace no. 1 receiving lime at the tap 2 or 3 energy level and furnace no. 2 receiving oxygen at the tap 2 or 3 energy level, both furnaces' electrode hood dampers and door dampers may be at 100% open and the fans' speed may be at 93% of maximum speed.

State 52: With furnace no. 1 at the tap 2 or 3 energy level and furnace no. 2 receiving both oxygen and lime at the tap 2 or 3 energy level, furnace no. 1's electrode hood damper may be at 55% open, its door damper at 30% open, furnace no. 2's electrode hood damper and door damper may be fully open and the fans' speed may be at 93% of maximum speed.

State 53: With furnace no. 1 receiving lime at the tap 2 or 3 energy level and furnace no. 2 receiving oxygen and lime at the tap 2 or 3 energy level, furnace no. 1's electrode hood damper may be at 70% open, its door damper may be at 50% open, furnace no. 2's electrode hood damper and door damper may be fully open and the fans' speed may be at 93% of maximum speed.

These different states and settings for fan speed and openings for the electrode hood dampers and door dampers are given for purposes of illustration only. With a spout hood installed on furnace no. 2, for example, the arrangements and values for some of the states may be expected to vary. These illustrative examples are for settings that in some settings will achieve the goal of maximizing the volume of fumes collected at the furnaces while minimizing energy usage, to achieve the most efficient system possible.

The present invention also provides a method of filtering dirty air. A compartment is provided, such as the bag house collector compartment 17, with a filter, such as the compartment and filters 304 shown in FIG. 30. It should be understood that each compartment may contain several such filters. A duct is connected to the open end of the filter or filters, such as the common duct 305 shown in FIG. 30, and a variable speed fan, such as in 18 in FIG. 1, is provided and is connected to draw air from the compartment 303 through the filter 304 to the filter's clean air side and from the clean air side of the filter through the duct 306. A damper is provided for selectively closing the air flow path between the filter 304 and the duct 306 in the illustrated embodiment, the dampers 308 serve this purpose. A plurality of pressure differential values across the filter that vary with the fan speed at which the fan or fans are set, such as described above using the formula $\Delta P = CFM\ (4.29[10^{-5}])$, although it should be understood that this formula is provided only for purposes of providing an example of an algorithm that may be used; the values for the pressure differential and fan speed may be set in other ways, for example, without applying any particular formula. The pressure differential across the filter is determined, through use, for example, of a pressure transducer, of any variety. The speed at which the variable speed fan is rotating is determined: this determination can be through a simple feedback mechanism, can be a measured value, or can be a relative value; it can be the rotation of the fan or motor, in revolutions per minute, or the volume of air moved per minute. The dampers are then closed when the values determined for the pressure differential and fan speed match the set values for pressure differential and fan speed. The dampers may be closed automatically, as through use of an actuator, or manually. After the dampers are closed, the filters may be cleaned with a pulse of air which may be introduced into the interior of the filter to blow out in a reverse direction toward the surrounding compartment 303 to force the dust off of the filter exterior. The method may be employed with a bag house having a plurality of compartments, such as illustrated in FIG. 28, and with individual dampers 308 to be opened and closed when the pressure differential and fan speed match the set values. A single pressure transducer may be used to measure the pressure differential across the collector's dirty air manifold 302 and clean air manifold 306. The programmable logic controller 500 controls the compartment dampers 308 to close and for pulse cleaning to occur one compartment at a time. The next compartment is not then cleaned until the set $\Delta P$ value is again equaled or exceeded. Preferably, the pressure differentials and fans speed are determined periodically and compared to the set values periodically so that the system may be periodically cleaned as necessary.

The present invention also provides a method of collecting emissions from a metal melting and pouring system of the type having an arc furnace with a crucible, a roof with holes for electrodes, a spout for pouring molten metal, a door, a pipe for introducing a mineral into the contents of the crucible, an oxygen lance for introducing oxygen into the interior of the crucible, and electrodes operable at a plurality of different energy levels for heating the interior of the crucible. An electrode hood, such as that shown at 20 in FIG. 3, adjacent the electrode openings 34 in the roof 36 of the furnace 30 is provided, along with a spout hood 24 adjacent to the spout 42 of the furnace 30. A door hood is provided near the door of the furnace, such as the back door hood 22 shown in FIG. 4. A manifold is connected to receive air from the electrode hood, spout hood and door hood, such as the tilting duct manifold 26 shown in FIGS. 3–4. A stationary duct is also provided, such as the duct 28 shown in FIG. 3. A variable speed fan is provided and connected to draw air through the stationary duct from the manifold and through the manifold from the electrode hood, spout hood and door hood, as the fan 18 is shown in FIG. 1. An electrode hood damper 60 is provided between the electrode hood 20 and the manifold 26 so that the flow of air from the electrode hood to the manifold can be controlled. A spout hood damper 144 between the spout hood 24 and the manifold 26 so that the flow of air from the spout hood to the manifold can be controlled. A door hood damper such as the door damper 64 is provided between the door hood 22 and the manifold 26 so that the flow of air from the door hood to the manifold can be controlled.

The method also involves determining the energy level of the furnace. This determination may be made as an observation of the furnace controls, with an indication of whether the electrodes are at the tap 1, tap 2, or tap 3 energy levels, for example; this step may also involve providing an electric signal to a central processing element, such as the programmable logic controller described above, indicating the energy level of the electrodes in the furnace. The method involves determining whether oxygen is being introduced into the furnace through the oxygen lance for example. Such a determination can be through observation, with, for example, a manual input to a programmable logic controller or may be an automatic input to such a controller, or may simply be an event that is noted by an operator. The method also involves determining whether metal is being poured through the spout of the furnace. Such a determination would typically be a visual one, with the operator noting that the pour is about to start and possibly inputting this information, such as by depressing a control button to send an electric signal to a logic controller or otherwise acting on the information. The speed of the fan 18 is determined, such as by a feedback to a logic element or some other reading of the actual or relative speed of the fan. The method also involves determining whether mineral is being introduced into the furnace through the pipe; such a determination can be through visual observation by the operator or through some sensor, such as a switch that is activated by the blower. The method then involves adjusting the electrode hood damper 60, adjusting the spout hood damper 144, and adjusting the door hood damper 64.

The step of adjusting the electrode hood damper 60 may involve positioning the dampers between the completely open and completely closed positions as described above. It may be preferred to close the spout hood damper 144 when metal is not being tapped through the spout 42 and when the spout hood 24 is not in position over the spout 42. The method may also involve adjusting the speed of the fan 18 or fans if two fans are provided as described so that the fan speed increases when oxygen is introduced into the furnace and when lime is introduced into the crucible; fan speed may be decreased when the furnace power is off or lowered. The size of the path past the electrode hood damper 60 and the size of the path past the door damper 64 may be made smaller to draw a smaller volume of air when the power is decreased; the size of the path may also be made to depend on whether pebble lime or oxygen are introduced. The method may also involve, where the stationary duct 28 is connected to an intake manifold such as, for example, that shown at 302 in FIG. 28 in a bag house 16, cleaning the filters in the bag house. The bag house may include a plurality of collectors 17 with compartments such as those shown at 303 in FIG. 28 receiving air flow from the dirty air intake manifold 302, with at least one filter 304 typically within each collector compartment 303 and an exhaust 306 connected to receive clean air from the filter 304. A damper such as those shown at 308 in FIG. 28 may be provided between each collector 17 and clean air exhaust 306, the fan 18 being downstream of the filter 304. The method may further comprise the steps of preselecting a plurality of values for the pressure difference upstream and downstream of the filter for a selected set of fan speeds, as described above. The difference in pressure upstream and downstream of the filter would be determined, such as through a pressure transducer, and the speed of the fan or fans would be determined, such as through a feedback of actual fan rotational speed or relative rotational speed, as, for example, a relative level; as described, the fan speed may also be determined as a volume of air per unit time, either measured or determined through feedback or a relative value. The determined difference in pressure and determined speed of the fan is compared with the preselected levels, and the damper 308 is closed when the determined difference in pressure and determined fan speed reaches one set of the preselected values.

While only specific embodiments of the invention have been described and shown, it is apparent that various alternatives and modifications can be made thereto, and that parts of the invention may be used without using the entire invention. Those skilled in the art will recognize that certain modifications can be made in these illustrative embodiments. It is the intention in the appended claims to cover all such modifications and alternatives as may fall within the true scope of the invention.

I claim:

1. A method of filtering dirty air that includes emissions received from an electric arc furnace comprising the steps of:

providing a compartment connected to receive dirty air;

providing a filter in the compartment and having a dirty air side and a clean air side;

providing a duct connected to the clean air side of the filter;

providing a variable speed fan connected to move air into the compartment and through the filter to the clean air side of the filter and from the clean air side of the filter to the duct;

selectively changing the speed at which the variable speed fan operates during operation of the electric arc furnace;

providing a damper for selectively closing the air flow path between the filter and the duct;

setting a plurality of pressure differential values across the filter for different speeds at which the fan rotates;

determining the pressure differential across the filter;

determining the speed at which the fan rotates;

closing the damper when the values determined for the pressure differential and fan speed match the set values for pressure differential and fan speed;

initiating a filter cleaning cycle.

2. The method of claim 1 wherein the step of determining the speed at which the fan rotates includes receiving feedback from the fan motor.

3. The method of claim 1 wherein a plurality of compartments and filters are provided and the pressure differential is determined across the compartment.

4. The method of claim 1 wherein the pressure differential and fan speed are determined periodically and compared to the set values for pressure differential and fan speed periodically.

5. The method of claim 1 wherein a plurality of compartments with filters are provided, the method including initiating a separate cleaning cycle for each compartment.

* * * * *